US012573787B1

(12) United States Patent
Casey

(10) Patent No.: US 12,573,787 B1
(45) Date of Patent: Mar. 10, 2026

(54) ACCESS POINT PORT SECURITY SYSTEM AND LOCKING PLUG COVER APPARATUS

(71) Applicant: Calix, Inc., San Jose, CA (US)

(72) Inventor: Martin Liam Casey, Dallas, TX (US)

(73) Assignee: Calix, Inc., San Jose, CA (US)

( * ) Notice: Subject to any disclaimer, the term of this patent is extended or adjusted under 35 U.S.C. 154(b) by 277 days.

(21) Appl. No.: 18/479,086

(22) Filed: Oct. 1, 2023

(51) Int. Cl.
*H01R 13/52* (2006.01)
*H01R 25/00* (2006.01)

(52) U.S. Cl.
CPC ....... *H01R 13/5213* (2013.01); *H01R 25/003* (2013.01)

(58) Field of Classification Search
None
See application file for complete search history.

(56) References Cited

U.S. PATENT DOCUMENTS 6,309,239 B1 * 10/2001 Johnston .............. H01R 13/447 174/67
7,271,337 B2 * 9/2007 Le Mon ............. H01R 13/6397 174/64
7,798,837 B1 * 9/2010 Gardner ............... G01G 23/017 174/92

FOREIGN PATENT DOCUMENTS

DE 10140294 A1 * 3/2003 ......... H01R 13/6397

* cited by examiner

*Primary Examiner* — Tho D Ta
(74) *Attorney, Agent, or Firm* — Staniford Tomita LLP

(57) ABSTRACT

Access point network equipment has communication ports that allow communications with other network components. Communications cables coupled to ports can be easily removed and replaced with unauthorized devices that have access to the network creating a security breach. Covers placed over the authorized cable connectors can create a physical barrier preventing unauthorized connections to the access point network equipment. When an authorized cable is removed from a port, a link down event can be detected by tamper detection by tamper detection software running on the access point network equipment. When a link down events is detected the tamper detection software can perform various possible security actions to protect the network.

16 Claims, 17 Drawing Sheets

ACCESS POINT PORT SECURITY SYSTEM AND LOCKING PLUG COVER APPARATUS

BACKGROUND

Communication cables are used to connect various computer devices to each other and an internet service provider to send and receive electronic communications. It can be very important to prevent unauthorized access to the network to avoid data breaches, viruses, and/or unauthorized access the data and programs stored on the network. The ends of the communications cable can be coupled to registered jack (RJ) connector plugs that are placed in the female jack ports in access points (AP) network system components. The RJ plugs can be easily removed from the RJ ports by moving the latch lever to unlock the locking latch which allows the RJ plug to be freely removed from the RJ port.

The AP network system components can have both open and filled connector jack ports. A problem with these ports is that it is easy for unauthorized computing devices to be connected to these ports which are potential vectors for attack by third parties that could compromise the network security and allow security breaches of the computer networks.

What is needed are security systems and locking mechanisms for AP network equipment ports that can prevent unauthorized access to AP network equipment. For example, a locking RJ plug that can fill unused RJ ports to prevent unauthorized access to the network components and a locking cover that prevents the unauthorized removal of RJ plug connectors and cables from the RJ ports in the network components. What is also needed is software that can detect tampering and respond by disabling the AP jack ports and/or AP network equipment.

DETAILED DESCRIPTION

Figure 1:
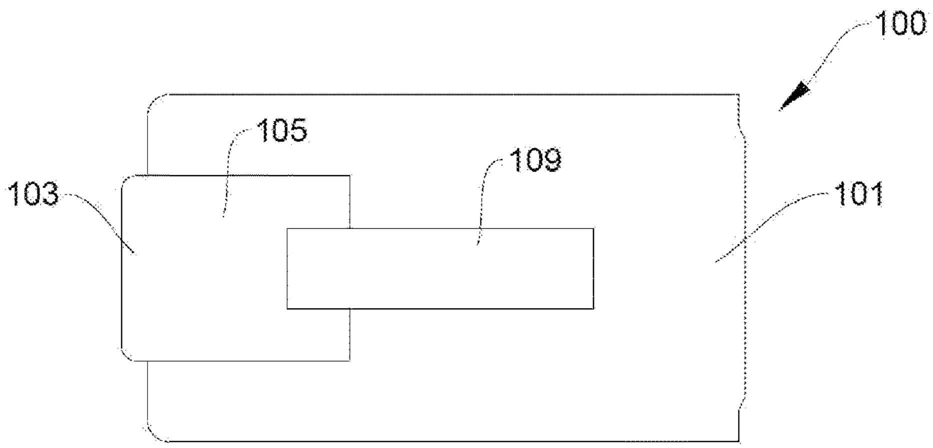
FIG. 1 is a top view of an embodiment of the locking plug.

The present invention includes systems and apparatus for preventing unauthorized connections to AP network equipment through communications ports. AP network equipment can have both unfilled ports and filled ports that are connected to communication cables. The locking devices can prevent unauthorized connections to both unused communications ports as well as used communications ports in the AP network components. The unfilled jack ports of the AP network components can each be filled with a locking RJ plug that is not coupled to an Ethernet communications cable. The locking RJ plug can be installed using a proprietary tool so that once installed and locked, the locked RJ plug cannot be removed by unauthorized users without damaging the connected AP network equipment or being detected by security software running on the AP network equipment. By locking an RJ connector plug into each of the unused AP jack ports, unauthorized Ethernet cables cannot be connected to the open and unused AP jack ports.

In an embodiment, a locking RJ connector plug can be inserted into an open AP jack port and then locked to prevent removal. The locking RJ connector plug can include a plug body that can fill the AP jack, a locking latch, a latch lever coupled to the locking latch, and a hinge coupled to the upper front edge of the plug body and a front portion of the locking latch. When the connector plug is inserted into an AP jack port, the locking latch is deflected towards the plug body. When the connector plug is fully inserted into an AP jack port, the locking latch springs away from the plug body and engages a corresponding locking inner surface of the AP jack port that holds the plug in the AP jack port.

The locking RJ connector plug can also include a locking mechanism that can prevent the locking latch from being moved so that the plug cannot be removed from the AP jack port. In an embodiment, the locking mechanism can include an elongated axial member that is mounted in an elongated bore that extends axially along the length of a center portion of the plug body. A radial member is coupled to a side surface of the axial member within the bore. The locking mechanism can have a locked position where the radial member is in a position to prevent the locking latch from disengaging its corresponding locking slot in the AP jack. The locking mechanism also has an unlocked position where the radial member does not prevent the locking latch from disengaging its corresponding locking slot in the AP jack. The locking mechanism can be rotated within the plug body between locked and unlocked positions. The locking mechanism can have a proprietary driving head that requires a proprietary tool to rotate the locking mechanism between the locked and unlocked positions.

Locking RJ connector plug covers can be placed around the authorized RJ connector plugs to prevent the removal of the authorized Ethernet cables from the filled AP jacks of the network components. In some embodiments, the locking RJ connector plug cover can include two cover pieces coupled to each other by a hinge. One of the cover pieces has a locking protrusion adapted to engage a recess in a bottom surface of the RJ cable connector plug at an end of the communications cable. The locking RJ connector cover can be closed to cover the cable RJ connector by rotating the cover pieces around the hinge. The two pieces can be fastened to each other by a fastener. In other embodiments, the plug cover can include multiple separate pieces that can be secured to each other with fasteners. In some embodiments, a component of the plug cover can be rigidly coupled to the RJ connector port portion of the AP network equipment. In some embodiments, the plug cover fasteners can be threaded bolts that have proprietary driving heads. The fasteners can require a proprietary tool to rotate the fasteners to prevent unauthorized disassembly of the RJ connector plug covers. In other embodiments, other types of locking fasteners can be used to secure the cover pieces to each other.

In some embodiments, the locking plug can include a modified RJ plug structure that can provide a physical deterrent that can prevent third parties from gaining easy access to empty ports on the AP network equipment. The locking cover can also provide a physical deterrent that can prevent third parties from removing authorized RJ cable connectors from the jack ports on the AP network equipment. The locking plugs and the locking covers can be parts of an overall security solution.

In addition to the physical deterrence provided by the locking plug and the locking connector plug cover, software running on the AP network equipment can be used to provide a tampering security service to provide a higher level of tampering security. The software can be configured to have various different response reactions to detected tampering at the RJ jack ports of the AP network equipment. In some embodiments, the tamper software can control the AP network equipment to transmit a notification of tampering to a computing device of a system administrator or a tampering security service.

A network administrator or a tampering security service can respond by instructing the software to turn off the port or the entire AP network equipment. If the detected tampering is investigated and resolved, the network administrator or a tampering security service can instruct the software to turn on the port or turn on the entire AP network equipment. In some embodiments, the tamper software can control the AP network equipment to turn off the port or the entire AP network equipment and transmit a notification of tampering to a computing device of a system administrator or a tampering security service.

In some embodiments, a network system administrator computing device can communicate and control the AP network equipment via a mobile application (App) and Cloud Service Commerce (CSC), or other control systems. If the detected tampering is investigated and resolved, the network administrator or a tampering security service can instruct the software to turn on the port or turn on the entire AP network equipment.

In some embodiments, where the network requires high security, the tamper software can transmit a notification of tampering to a computing device of a system administrator or a tampering security service and then control the power supply of the AP network equipment to destroy the AP network equipment. The power supply can be controlled to increase the power transmitted through a fuse or a trace in the electrical system of the AP network equipment. The increased power can destroy the fuse or trace so that the AP network equipment is disabled. The AP network equipment can then be investigated and possibly repaired to replace the fuse or trace.

The security system can include both software and hardware components that work together to prevent unauthorized access. AP network equipment has communication ports which can be Ethernet, phone, universal serial bus (USB), and other types of ports that are used to physically connect communication cables to other network equipment components. The AP network equipment can have both filled communication ports that are coupled to cable plugs and communications cable and unfilled communication ports that are normally available for future cable connections. Tampering can include removal of the plugs in the filled ports and/or placing unauthorized cable plugs into the ports. To prevent tampering with authorized cables, the system can include locking covers placed over the authorized cable plugs so that the authorized cable cannot be removed from the AP network equipment. To prevent tampering with open ports in the AP network equipment, locking plugs can be placed into all unfilled ports and locked to prevent unauthorized cables from being connected. The locking plugs can also be covered with the locking covers for further security. The security system can also include software that can detect tampering and respond with security actions such as disabling individual ports or disabling the AP network equipment to prevent unauthorized access to the connected network.

The locking plug can prevent unauthorized connections to unused communications ports. The locking RJ plug can be a small port plug structure that is not coupled to a communications cable. The locking RJ plug can be installed into the port and then locked using a proprietary tool so that the locked RJ plug cannot be removed by unauthorized users without damaging the port and/or the connected AP network equipment. By locking the RJ connector plugs into each of the unused AP jack ports, unauthorized Ethernet cables cannot be connected to the open and unused AP jack ports. If an unauthorized user is successful in removing the locking RJ plug, this unauthorized activity can be detected by security software running on the AP network equipment.

Figure 2:
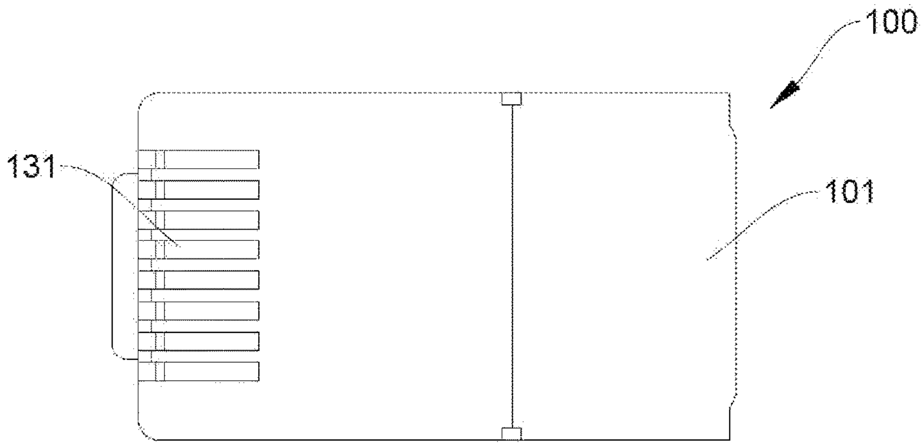
FIG. 2 is bottom view of an embodiment of the locking plug.
Figure 3:
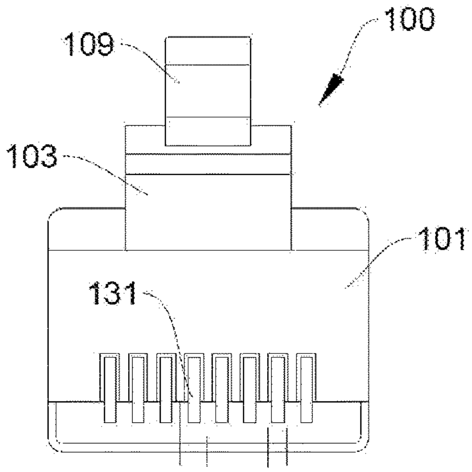
FIG. 3 is a front view of an embodiment of the locking plug.
Figure 4:
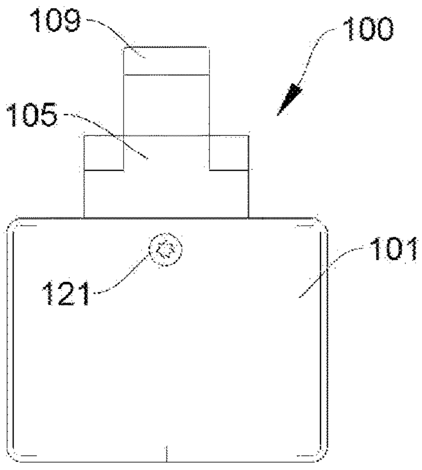
FIG. 4 is a back view of an embodiment of the locking plug.

FIG. 1 is a top view of an embodiment of a locking connector plug 100, FIG. 2 is bottom view of an embodiment of the locking connector plug 100, FIG. 3 is a front view of an embodiment of the locking connector plug 100, and FIG. 4 is a back view of an embodiment of the locking connector plug 100. As shown in FIGS. 1-4, in some embodiments, the locking connector plug 100 can have a connector plug body 101 that has a basic rectangular box shape and is adapted to fit within a connector jack of a AP network component device. Examples of AP network component device include: routers, computing devices, peripheral components, network switches, etc.

A hinge 103 can be coupled to a front top portion of the connector plug body 101 and a locking latch 105 can be coupled to the hinge 103. The locking latch 105 can extend from the front top portion towards a rear portion of the connector plug body 101, and the locking latch 105 and an upper surface 107 of the connector plug body 101 can form an acute angle. A latch lever 109 can be coupled to the locking latch 105 for rotating the locking latch 105 about the hinge 103. When the locking connector plug 100 is inserted into a corresponding jack port of the AP network device, the locking latch 105 is fully inserted and engages an inner facing edge of the port. This locking latch engagement holds the locking connector plug 100 in place and prevents the locking connector plug 100 from being removed from the port. The locking latch lever 109 moved towards the connector plug body 101 to release the locking latch 105 from the inner facing edge of the port to the locking connector plug 100 can be removed from the port. In some embodiments, the hinge 103 and the locking latch 105 can be formed in one piece with the connector plug body 101 and can be made of suitable materials, such as plastics so that the hinge 103 can have elasticity. When the locking member 115 of the locking connector plug 100 is in its unlocked position, the locking connector plug 100 can be plugged into an unused socket jack port and locked in place to prevent unauthorized access and/or use.

Figure 5:
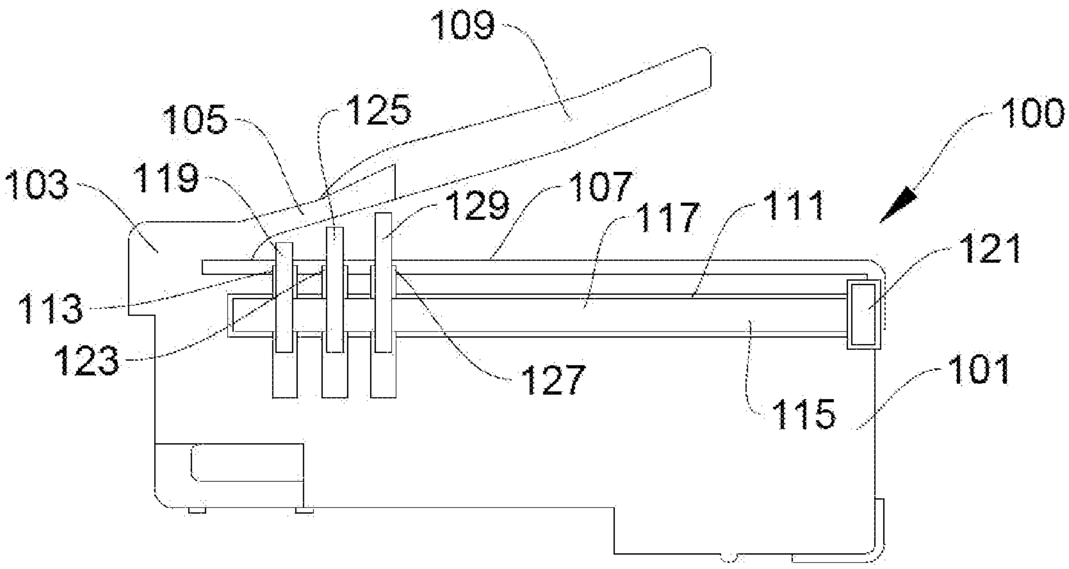
FIG. 5 is a side view of an embodiment of the locking plug in a locked configuration.
Figure 6:
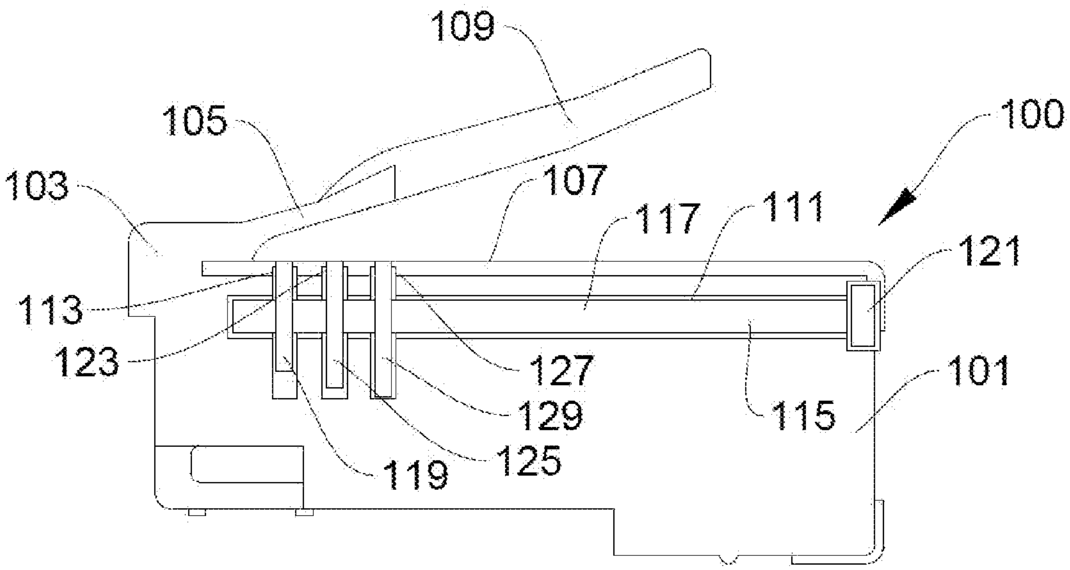
FIG. 6 is a side view of an embodiment of the locking plug in an unlocked configuration.

FIG. 5 is a cross-section side view of an embodiment of the locking connector plug in a locked configuration and FIG. 6 is a cross-section side view of an embodiment of the locking connector plug in an unlocked configuration. A bore 111 in the connector plug body 101 can extend axially from the rear portion of the connector plug body 101 to a front portion of the connector plug body 101. A first slot 113 in the connector plug body 101 can extend from the bore 111 through the upper surface 107 to areas under the locking latch 105. The locking connector plug 100 can have a locking member 115 that includes an axial member 117 and a first radial member 119 coupled to a side of the axial member 117. The axial member 117 can rotate within bore 111 and the first radial member 119 can rotate within the first slot 113.

As shown in FIGS. 5 and 6, the axial member 117 and the driving feature 121 are within the bore 111. In FIG. 5, the locking member 115 is in a locked position where the first radial member 119 extends through the first slot 113 to a position above the upper surface 117 of the connector plug body 101 to prevent the locking latch 105 from moving towards the upper surface 117 of the connector plug body 101. In FIG. 6, the locking member 115 is in an unlocked position where the first radial member 119 is moved to a lower position that does not prevent the locking latch 105 from moving towards the upper surface 117 of the connector plug body 101. The locking member 115 can have a non-standard and/or proprietary driving feature 121 on a rear portion of the axial member 117 as shown in FIG. 4 that can prevent the actuation of the locking member 115

In some embodiments, as also shown in FIGS. 5 and 6, the locking connector plug 100 can have a second slot 123 and a third slot 127 that extends from the bore 111 through the upper surface 107 of the connector plug body 101 to other areas under the locking latch 105. A second radial member 125 and a third radial member 129 can be coupled to a side of the locking axial member 117. In the locked position as shown in FIG. 5, the second radial member 125 extends through the second slot 123 and the third radial member 129 extends through the third slot 127 to adjacent positions above the upper surface 117 of the connector plug body 101. The upper surfaces of the second radial member 125 and the third radial member 129 can also prevent the locking latch 105 from moving towards the upper surface 107 of the connector plug body 101. In the unlocked position as shown in FIG. 6, the second radial member 125 and the third radial member 129 are moved to lower positions that do not prevent the locking latch 105 from moving towards the upper surface 117 of the connector plug body 101. The radial members 119, 125, 129 can have various different possible shapes including circular discs, oval discs, or any other shape that allows for rotational movement within the slots 113, 123, 127 to positions under the locking latch 105.

The locking connector plug 100 can be inserted into an open jack port of AP network equipment. During the plug insertion, the latch lever 109 and the locking latch 105 is moved down towards to the upper surface 107 of the connector plug body 101 about the hinge 103. When the locking connector plug 100 reaches its fully inserted position in the jack port, the locking latch 105 can spring upward away from the upper surface 107 of the connector plug body 101 to engage an inner edge surface of the jack port. To lock the locking connector plug 100 in place, the locking member 115 can be rotated to its locked position with the proprietary wrench 133 having a driver end that fits the driving feature 121 on the axial member 117. The rotation can cause the radial members 119, 125, 129 pass through their corresponding slots 119, 125, 129 to positions above the upper surface 107 of the connector plug body 101 and under the locking latch 105. Since the radial members 119, 125, 129 are under the locking latch 105, even when the latch lever 109 is actuated, the locking latch 105 cannot be moved towards the upper surface 107 of the connector plug body 101. Thus, the locking latch 105 remains in its locking position and the locking connector plug 100 cannot be removed from the port.

When an authorized user wants to remove the locking connector plug 100, the locking member 115 can be rotated to its unlocked position with the proprietary wrench 131. This causes the radial members 119, 125, 129 to return to positions below the upper surface 107 of the locking connector plug 100 where the radial members 119, 125, 129 do not block the movements of the locking latch 105. The latch lever 109 can be actuated to move the locking latch 105 towards the upper surface 107 of the connector plug body 101 and the locking connector plug 100 can be removed from the jack port of the AP network equipment.

Figure 11:
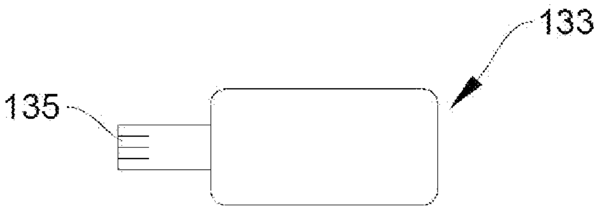
FIG. 11 is a side view of an embodiment of a proprietary tool used to actuate the locking mechanism in the locking plugs.
Figure 12:
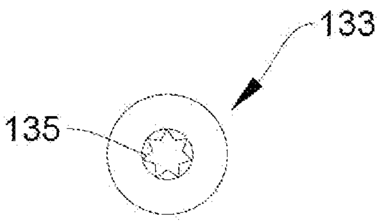
FIG. 12 is a front view of an embodiment of a proprietary tool used to actuate the locking mechanism in the locking plugs.

In some embodiments, as shown in FIG. 4, the driving feature 121 can be configured to be a recess with a non-standard driving feature that can require a special non-standard wrench to rotate the axial member 117. Common standard driving features include: flat head, Phillips head, and hex head driving features that are easily rotated with standard wrenches or screw drivers. Non-standard driving features can include star-shaped, asymmetric hole patterns, and other recessed or protruding features that require special wrenches to rotate to locking mechanism. FIG. 11 illustrates a side view and FIG. 12 illustrates a front view of a tool having a star-shaped driver head that can engage the driving feature on the locking mechanism and be used to rotate the locking mechanism between locked and unlocked positions. In some embodiments, the tool can be an elongated wrench 133 having a driving end 135 that corresponds to the driving feature 121. In some embodiments, the driving end 135 also has a star-shape that fits the recess with the star-shaped contour of the driving feature 121 on the rear portion of the axial member 117 as shown in FIG. 4. The elongated wrench 133 is used to rotate the locking member 115 between the locked position and the unlocked position.

Figure 7:
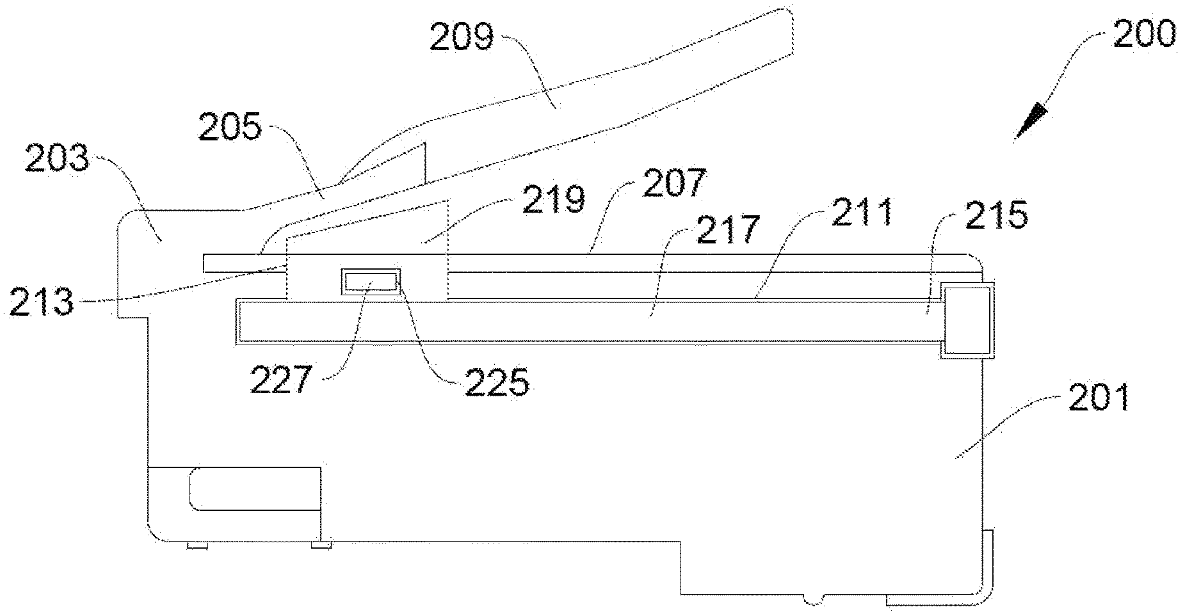
FIG. 7 is a side view of another embodiment of the locking plug in a locked configuration.
Figure 8:
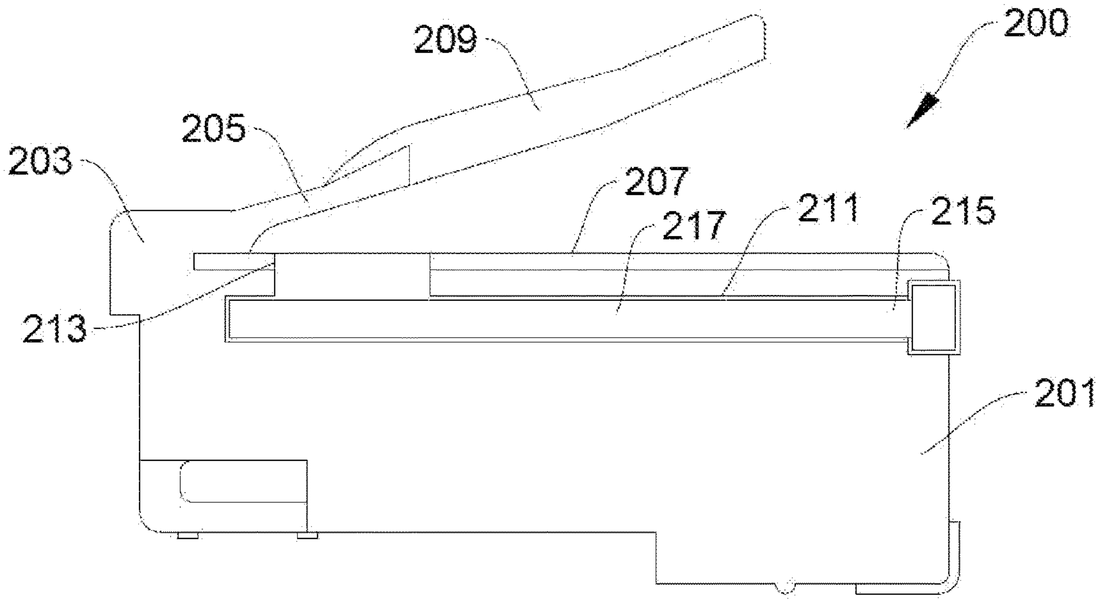
FIG. 8 is a side view of another embodiment of the locking plug in an unlocked configuration.
Figure 9:
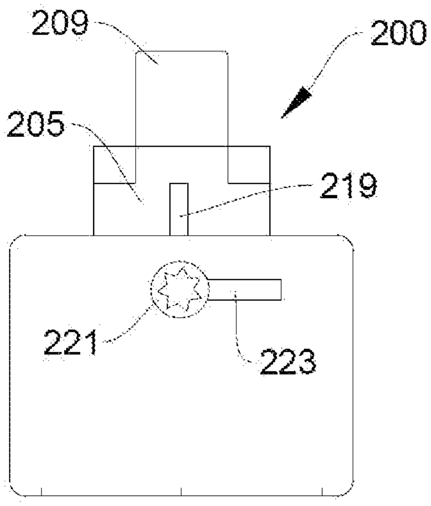
FIG. 9 is a back view of another embodiment of the locking plug in a locked configuration.
Figure 10:
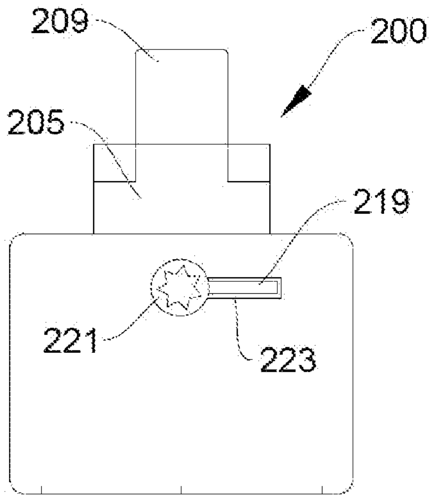
FIG. 10 is a back view of another embodiment of the locking plug in an unlocked configuration.

FIGS. 7-10 show another embodiment of a locking connector plug 200 that is similar to the locking connector plug 100 illustrated in FIGS. 1-6. FIG. 7 is a cross section side view of the embodiment of the locking connector plug in a locked configuration and FIG. 8 is a cross section side view of the locking connector plug in an unlocked configuration. FIG. 9 is a back view of the locking connector plug in a locked configuration and FIG. 10 is a back view of another embodiment of the locking connector plug in an unlocked configuration. The locking connector plug 200 can have a connector plug body 201, which is adapted to fit within a connector socket of a device such as a router or a network switch, etc. A hinge 203 can be coupled to a front top portion of the connector plug body 201. A locking latch 205 can be coupled to the hinge 203. The locking latch 205 can extend from the front top portion towards a rear portion of the connector plug body 201, and the locking latch 205 and an upper surface 207 of the connector plug body 201 can form an acute angle as shown in FIGS. 7 and 8. A latch lever 209 can be coupled to the locking latch 205 for rotating the locking latch 205 about the hinge 203.

As shown in FIGS. 7 and 8, a bore 211 in the connector plug body 201 can extend axially from the rear portion of the connector plug body 201 to a middle portion of the connector plug body 201. A hole 213 can extend from the bore 211 through the upper surface 207 of the connector plug body 201 under the locking latch 205. The locking connector plug 200 can have a locking member 215. The locking member 215 can have a key member 219 coupled to a side of the axial member 217. As shown in FIGS. 9 and 10, a driving feature 221 can be provided on a rear portion of the axial member 217. In some embodiments, the driving feature 221 can be configured to be star-shaped. A tool such as a wrench with a shape fitting to the driving feature 221 can rotate the locking member 215. As shown in FIGS. 7 and 8, the axial member 217 and the driving feature 221 are within the bore 211.

FIGS. 7 and 9 show an embodiment of the connector plug body 201 in a locked position where the key member 219 extends through the hole 213 to a position above the upper surface 207 of the connector plug body 201 to prevent the locking latch 205 from moving towards the upper surface 207 of the connector plug body 201. FIGS. 8 and 10 show an embodiment of the connector plug body 201 in an unlocked position where the key member 219 is rotated to a lower position and the key member 219 does not prevent the locking latch 205 from moving towards the upper surface 207 of the connector plug body 201. In some embodiments, as shown in FIG. 7, an upper surface of the key member 219 can be similar or identical to the angle formed by the locking latch 205 and the upper surface 207 of the connector plug body 201.

The locking connector plug 200 can have a key slot 223 that allows the locking member 215 to be easily inserted into the connector plug body 201. The key slot 223 can be adjacent to and extend along a length of the bore 211. As shown in FIG. 10, the thickness of the key member 219 is less than the width of the key slot so that the key member 219 can pass through the key slot 223.

In some embodiments, as shown in FIG. 7, the locking connector plug 200 can have a tab 225 that can be a recess or hole in a side surface of the locking member 215. The tab 225 can be provided at the key member 219 so that the locking member 215 can be turned and the tab can engage a feature such as a protrusion 227 that can hold the key member 219 in the locking connector plug 200 and prevent the locking member 215 from sliding out of the bore 211.

In some embodiments, the hinge 203 and the locking latch 205 can be formed in one piece with the connector plug body 201. They can be made of suitable materials, such as plastics, making the hinge 203 have some elasticity. When inserting the locking connector plug 200 into the socket of the router, the latch lever 209 is pushed and the locking latch 205 is moved towards to the upper surface 207 of the connector plug body 201 about the hinge 203. When the locking connector plug 200 reaches its position in the socket, the push force is released and the locking latch 205 can return to its original position due to the elasticity of the hinge 203. Similarly, the latch lever 209 can be narrower than the locking latch 205 from the top view as illustrated in FIG. 1 or the back view of FIGS. 9 and 10, and the locking latch 205 can be kept in the socket. Then, the locking member 215 can be rotated to its locked position with the wrench 133 fitting the driving feature 221, where the key member 219 passes through the hole 213 and exceeds beyond the upper surface 207 of the connector plug body 201 under the locking latch 205. Since the key member 219 is under the locking latch 205, even if the latch lever 209 is pushed, the locking latch 205 cannot be moved towards the upper surface 207 of the connector plug body 201. Thus, the locking latch 205 remains in its locking position and the locking connector plug 200 cannot be plugged out. When the locking connector plug 200 is desired to be plugged out, the locking member 215 can be rotated to its unlocked position with the wrench 131, where the key member 219 returns to the position where it does not block the locking latch 205.

When the latch lever 209 is pushed, the locking latch 205 can be moved towards the upper surface 207 of the connector plug body 201 where the locking latch 205 is not in its locking position and the locking connector plug 200 can be plugged out.

As discussed above, in some embodiments the locking plugs can require a proprietary tool to move the locking mechanism into and out of the locked position. The proprietary tool can have special non-standard driving features. As shown in FIGS. 4, 9, and 10, the driving features 121, 221 can be a recess with a star shaped contour cross sectional shape. FIG. 11 illustrates a side view and FIG. 12 illustrates a front view of a proprietary tool 133 having a star shaped driver head 135 that can engage the driving features on the locking mechanisms. The proprietary tool 133 can be used to rotate the locking mechanism between locked and unlocked positions. In some embodiments, the proprietary tool 133 can be an elongated wrench 133 having a driving end 135 that corresponds to the driving feature 221. In some embodiments, the driving end 135 also has a star shape that fits the recess with the star shaped contour of the driving features, 121, 221 on the rear portion of the axial member 217 as shown in FIGS. 4, 9 and 10. In other embodiments, the proprietary tool 133 and the driving features, 121, 221 can have any other geometric shape that allows the actuation of the locking mechanisms.

Figure 19:
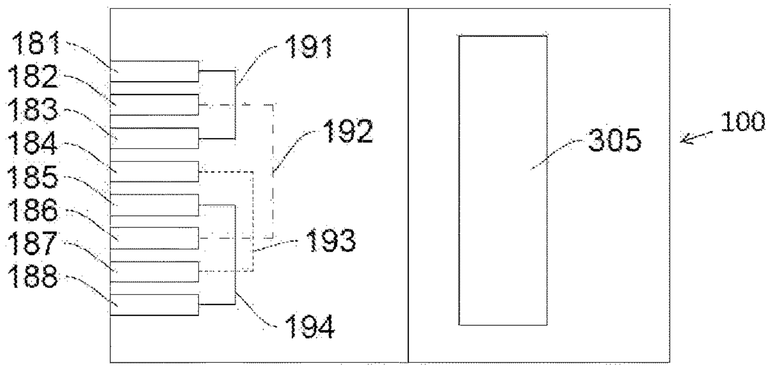
FIG. 19 is a bottom view of the locking connector plug showing an example of how the conductive connectors are coupled to each other.

In some embodiments, the locking connector plugs 100 including those described above, can have a plurality of conductive connectors 131 at a bottom front portion of the connector plug body 101. Two or more of the plurality of conductive connectors 131 are electrically coupled to each other to form a closed circuit. FIG. 19 illustrates an example of how the conductive connectors 181-188 are coupled to each other. In this example, there are 8 conductive connectors 181-188. As shown in FIG. 19, in some embodiments, a first conductive connector 181 can be coupled to the third conductive connector 183. In some embodiments, the second conductive connector 182 can be coupled to the sixth conductive connector 186. In some embodiments, the fourth conductive connector 184 can be coupled to the seventh conductive connector 187, and in some embodiments, the fifth conductive connector 185 can be coupled to the eighth conductive connector 188. When the locking connector plug 100 is connected to an AP network device, the locking connector plug 100 can be detected because of the closed circuit connected pairs of conductive connectors 181-188.

Figure 13:
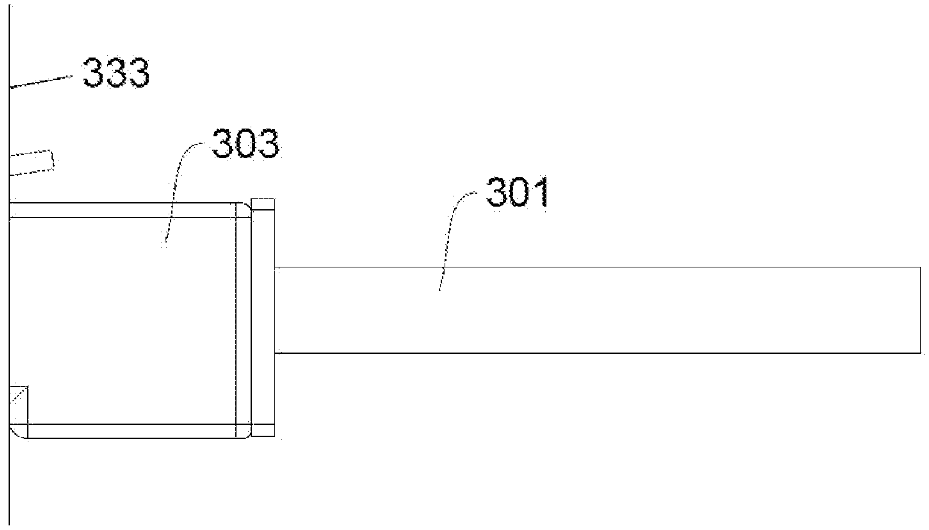
FIG. 13 illustrates a side view of an embodiment of a communication cable coupled to an RJ connector plug in an AP network equipment port.
Figure 14:
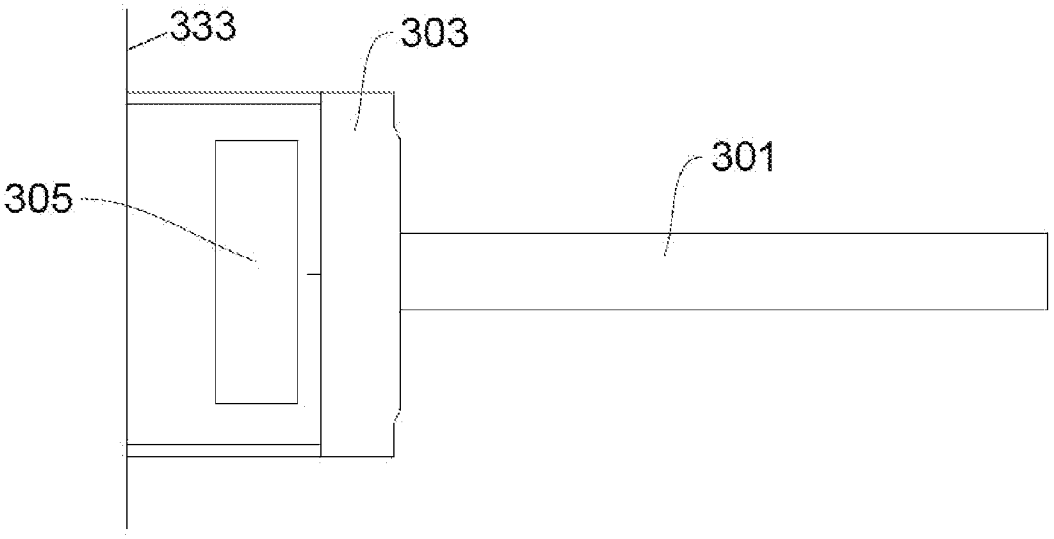
FIG. 14 illustrates a bottom view of an embodiment of a communication cable coupled to an RJ connector plug in an AP network equipment port.

FIG. 13 illustrates a side view and FIG. 14 illustrates a bottom view of a connector plug 303 and a connected cable 301 extending from a port of an AP network equipment 333. The upper and lower surfaces of the connector plug 303 can be parallel and planar and can extend at a 90 degree angle from a plane of the ports of an AP network equipment 333. The bottom of the connector plug 303 can have a recess 305 that can be used to secure a cover to the connector plug 303.

Figure 15:
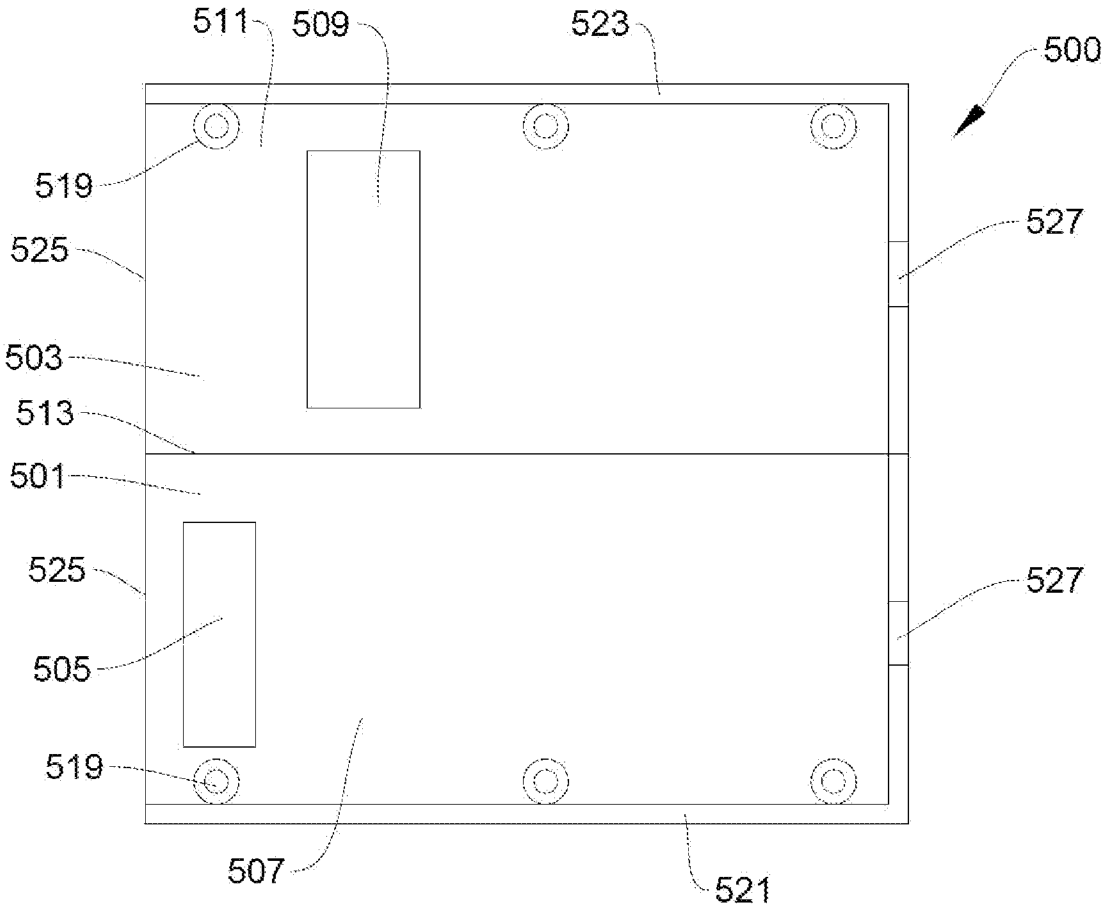
FIG. 15 is a top view of an embodiment of the locking cover in an opened position.
Figure 16:
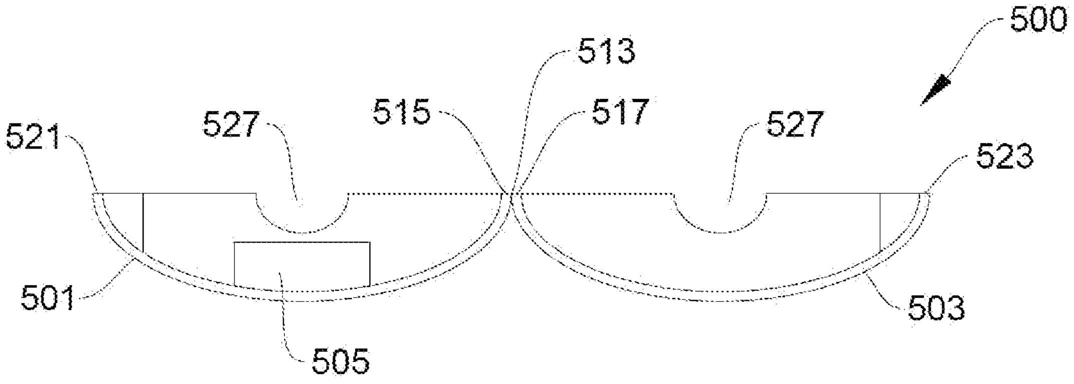
FIG. 16 is a front view of an embodiment of the locking cover in an opened position.

FIGS. 15 and 16 show an embodiment of the locking cover 500 can be used for covering and surrounding the cable connector plug 303 so that the plug 303 cannot be removed from the AP jack. The locking cover 500 can have a first upper cover piece 503 and a second lower cover piece 501. The lower cover piece 501 can have a locking protrusion 505 on a first concave inner surface 507 of the first cover piece 501. The locking protrusion 505 is sized to engage the recess 305 on a lower surface of the cable connector plug 303 as shown in FIG. 14. The upper cover piece 503 can have a planar surface 509 on a second concave inner surface 511 of the second cover piece 503 that can contact an upper surface of the cable connector plug 303 and hold the locking protrusion 505 in the recess 305 on a lower surface of the cable connector plug 303. The locking cover 500 can further have a connector opening 525 on a front end of the locking cover 500 adapted to surround a portion of the cable connector plug 303 and a cable opening 527 at a rear end of the locking cover 500 adapted to surround a portion of an electrical cable 301 extending from the cable connector plug 303.

In some embodiments, the locking cover 500 can also have a hinge 513 coupled to a first side 515 of the first cover piece 501 and a first side 517 of the second cover piece 503. The locking cover 500 can further have locking fasteners 519 for securing a second side 521 of the first cover piece 501 to a second side 523 of the second cover piece 503.

In some embodiments, the first cover piece 501, the second cover piece 503, the hinge 513 and the locking protrusion 505 can be made in one piece from a molded plastic material. The fastener 519 can be screws that can engage corresponding threaded holes to secure the first lower cover piece 501 to the second upper cover piece 503. In other embodiments, the first cover piece 501 and the second cover piece 503 can be physically separate high strength structures that may only be held together by fasteners 519 can couple these two cover pieces 501, 503 without a hinge.

The fasteners 519 can have drive heads that have a proprietary driving feature(s). These fasteners can require a proprietary tool to rotate the fasteners to prevent unauthorized disassembly of the RJ connector plug covers. The fasteners cannot be removed from the cover without the proprietary tool. In other embodiments, other types of proprietary locking fasteners can be used to secure the cover pieces to each other.

Figure 17:
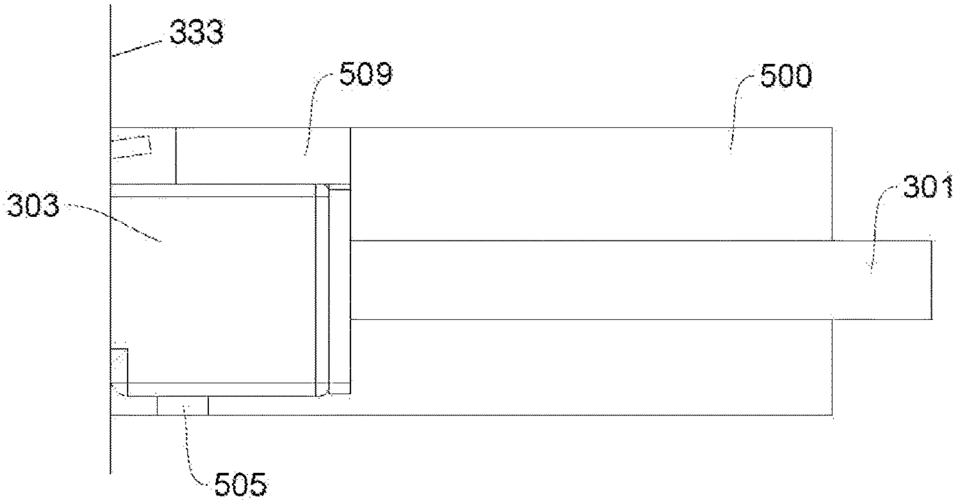
FIG. 17 is a cross section side view of an embodiment of a locking cover in a closed position coupled to an RJ connector plug in an AP network equipment port.
Figure 18:
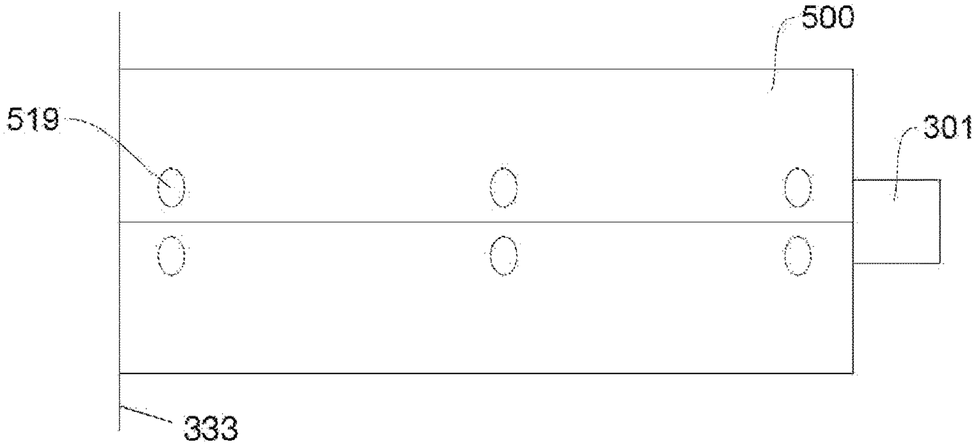
FIG. 18 is a side view of an embodiment of a locking cover in a closed position surrounding an RJ connector plug in an AP network equipment port.

When the cable connector plug 303, such as an RJ connector, is plugged into a network component AP jack (as shown in FIGS. 13 and 14), the inner surface of the lower cover piece 501 can contact the bottom side of the electrical connector 303. The locking protrusion 505 on the lower cover piece 501 can be placed in the recess 305 on the bottom side of the electrical connector 303. The upper cover piece 503 can be rotated around the hinge 513 and secured to the lower cover piece 501 so the locking cover 500 surrounds the cable connector plug 303 and an end portion of the cable 301 that extend from the AP network equipment 333 as shown in FIGS. 17 and 18. The fastener 519 can secure and lock the bottom cover piece 501 to the top cover piece 503. In some other embodiments, the connector cover can include two separate pieces and fasteners such as screws that can be used to secure both the second side 521 of the lower cover piece 501 and the second side 523 of the lower cover piece 503 to fasten the lower cover piece 501 and the upper cover piece 503.

Figure 20:
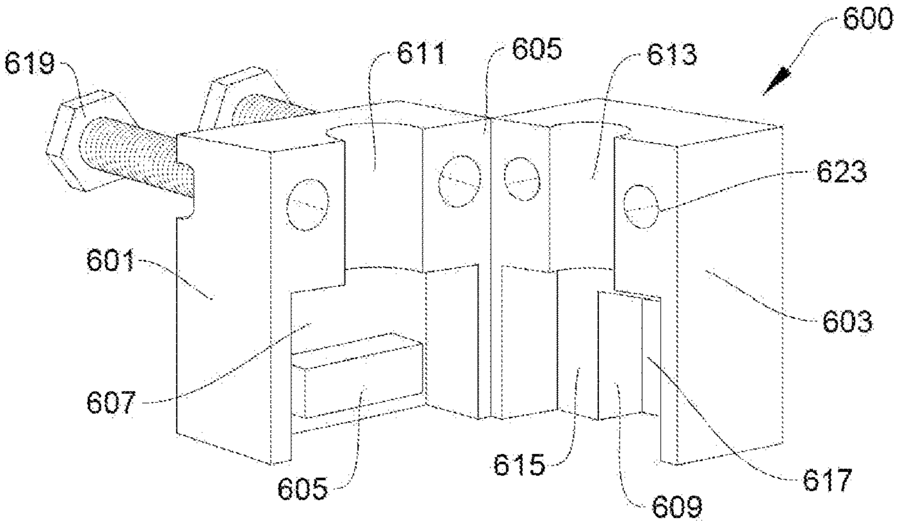
FIG. 20 is a perspective side view of an embodiment of an open cable connector locking cover.
Figure 21:
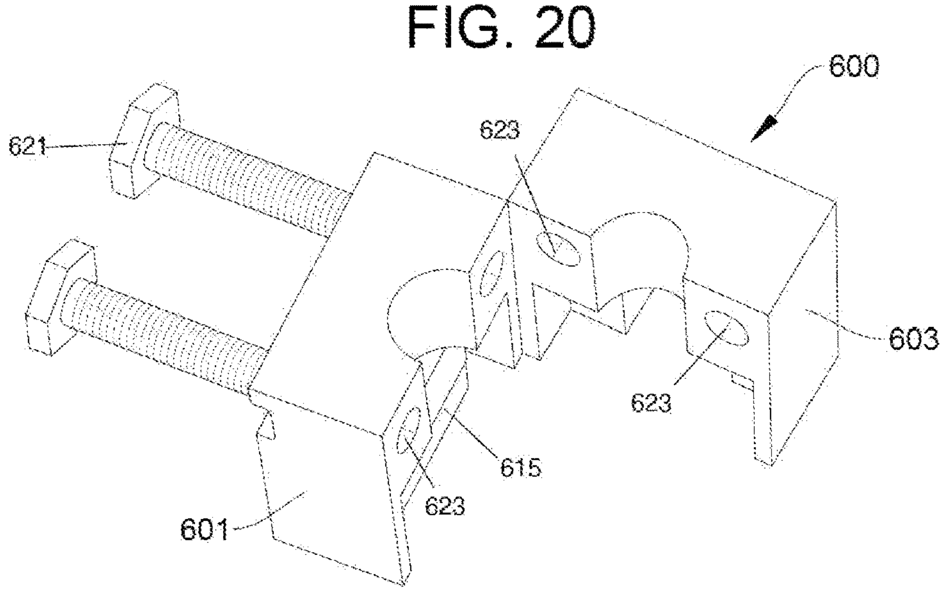
FIG. 21 is a perspective rear view of an embodiment of an open cable connector locking cover.
Figure 22:
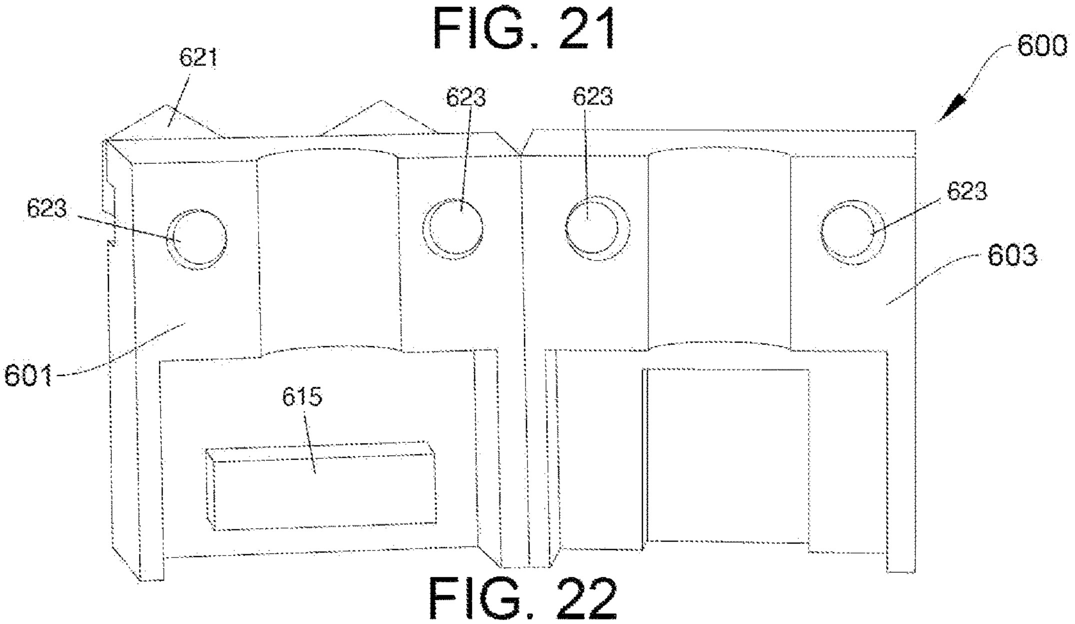
FIG. 22 is a perspective side view of the inner surfaces of an embodiment of an open cable connector locking cover.
Figure 23:
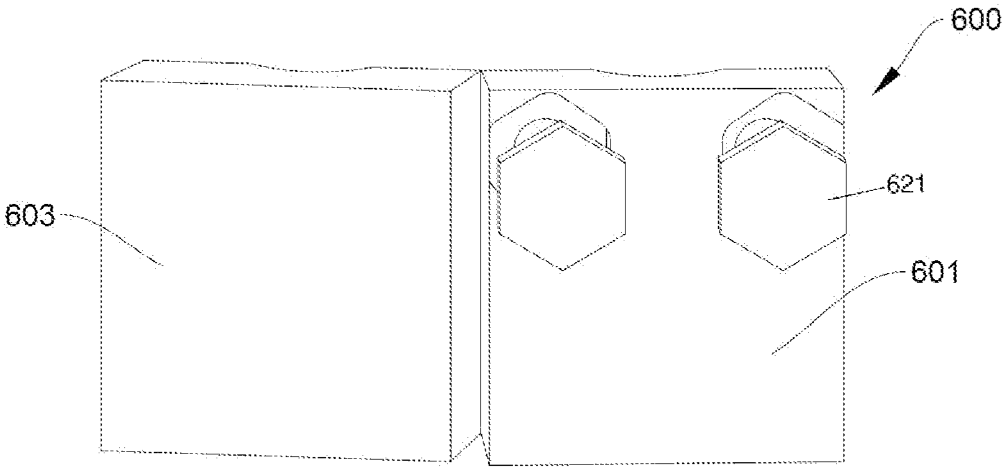
FIG. 23 is a perspective side view of the outer surfaces of an embodiment of an open cable connector locking cover.

FIGS. 20-24 show another embodiment of the locking cover 600. As shown in FIG. 20, the locking cover 600 can have a first cover piece 601 and a second cover piece 603. The two cover pieces 601, 603 can be coupled by a hinge 605 at their edges. The first cover piece 601 can have a first connector recess 607 and a first cable recess 611. The second cover piece 603 can have a second connector recess 609 and a second cable recess 613. A locking protrusion 615 can be provided in the first connector recess 607. The second connector recess 609 can have a planar surface 617 and a latch recess 619 that can provide space for the locking latch and lever when the locking cover is secured to an authorized cable connector.

In some embodiments, bolts 619 can be placed in holes 623 in one of the cover pieces 601 and screwed into corresponding thread holes 623 that can extend through the other cover piece 603 are provided. In this embodiment, there can be two bolts 619 can be driven into the corresponding two tread holes 623 to assemble and secure the two cover pieces 601, 603 around a cable connector.

Figure 24:
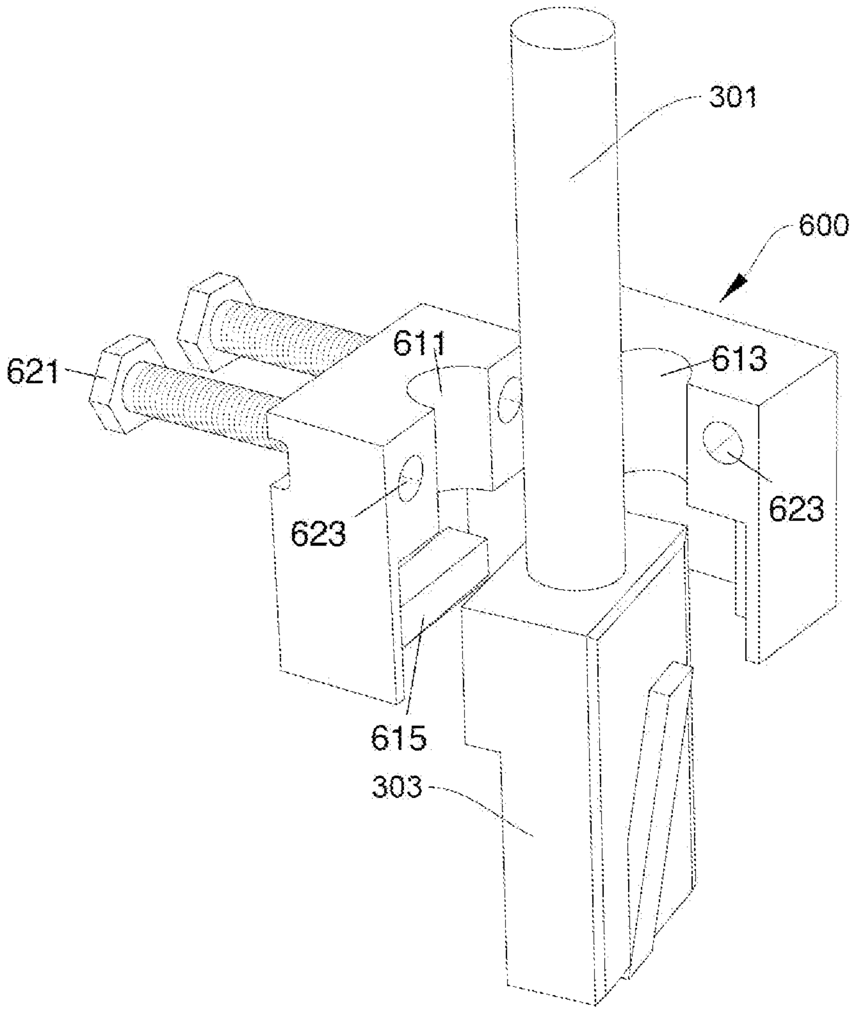
FIG. 24 is a perspective side view of an embodiment of a cable plug connector in an open cable connector locking cover.

As shown in FIG. 24, a cable connector plug 303 and a connected cable 301 can be placed in the open locking cover 600. The cable connector plug 303 can be fully inserted into a port on the AP network equipment. Then, the first cover piece 601 can be put under the bottom side of the electrical connector 303 with the locking protrusion 615 inserted into the recess 305 on the bottom side of the electrical connector 303. The second cover piece 603 can then be rotated around the hinge 605 making the locking cover 600 surround the cable connector plug 303. The cable connector plug 303 can be contained in a recess formed by the first connector recess 607 and the second connector recess 609, and cable 301 can be contained in a recess formed by the first cable recess 611 and the second cable recess 613. The top surface of the cable connector plug 303 can rest on the planar surface 617, and the locking latch and the latch lever can be contained in the latch recess 619. The two screws 621 can be driven into the corresponding thread holes 623 to secure and lock the two cover pieces 601, 603 to each other.

Figure 25:
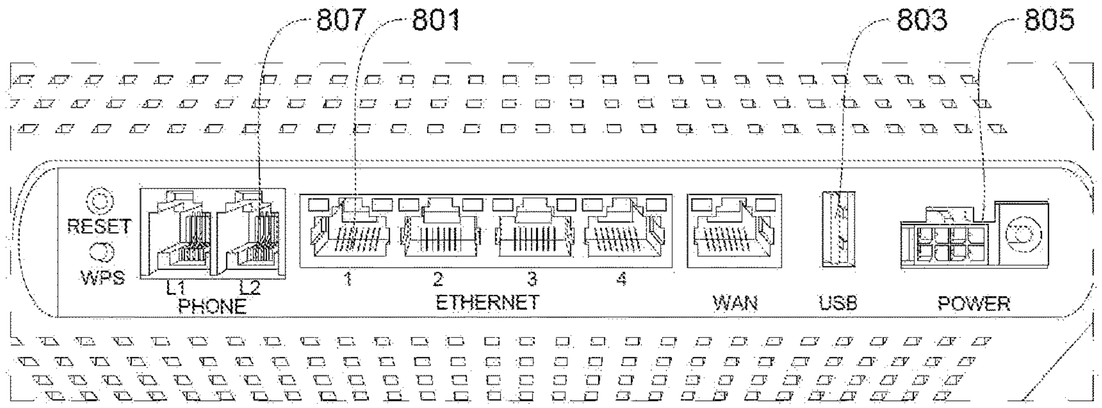
FIG. 25 illustrates a side view of an embodiment of an AP network equipment having various power, communications, and telephone ports.

FIG. 25 illustrates an example of a jack port portion of an AP network device 800 having multiple ports. In this example, the AP device 800 has four RJ ports 801, one USB port 803, one power jack port 805, one wide area network (WAN) port, and two phone jack ports 807. In addition to the ports, this portion of the AP network device can also have a reset switch and a WiFi protected setup (WPS) button.

Figure 26:
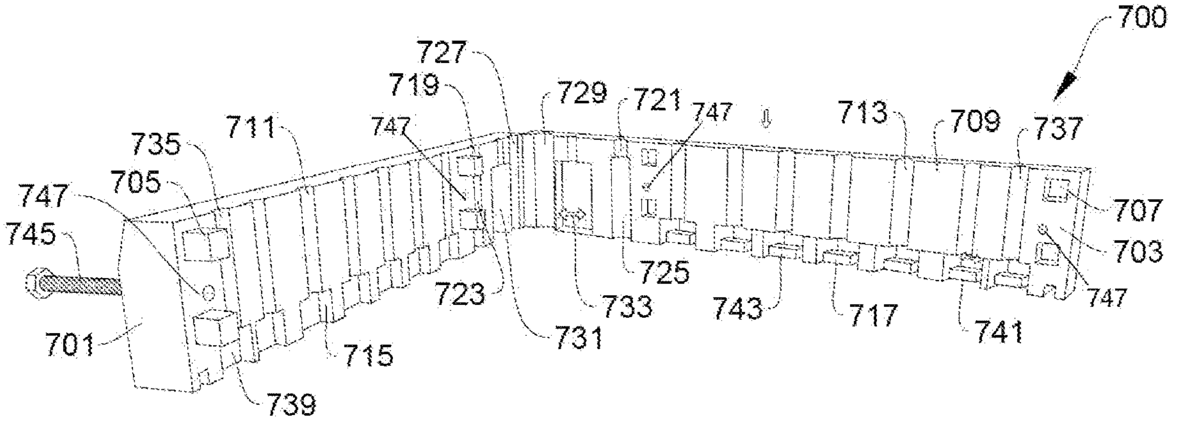
FIG. 26 illustrates a side perspective view of an embodiment of a hinged locking cover for multiple cable connectors.
Figure 27:
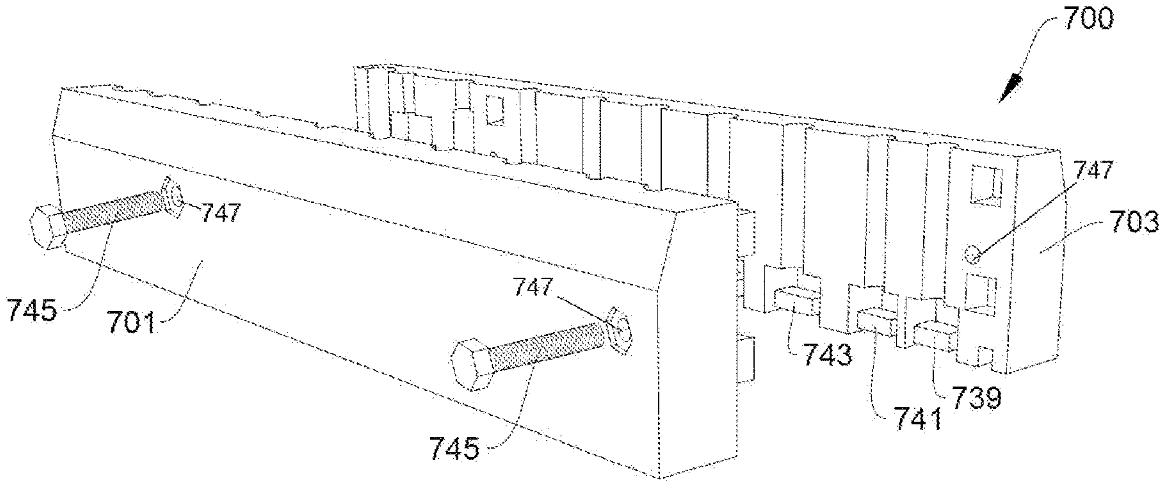
FIG. 27 illustrates a side perspective view of an embodiment of a locking cover for multiple cable connectors.
Figure 28:
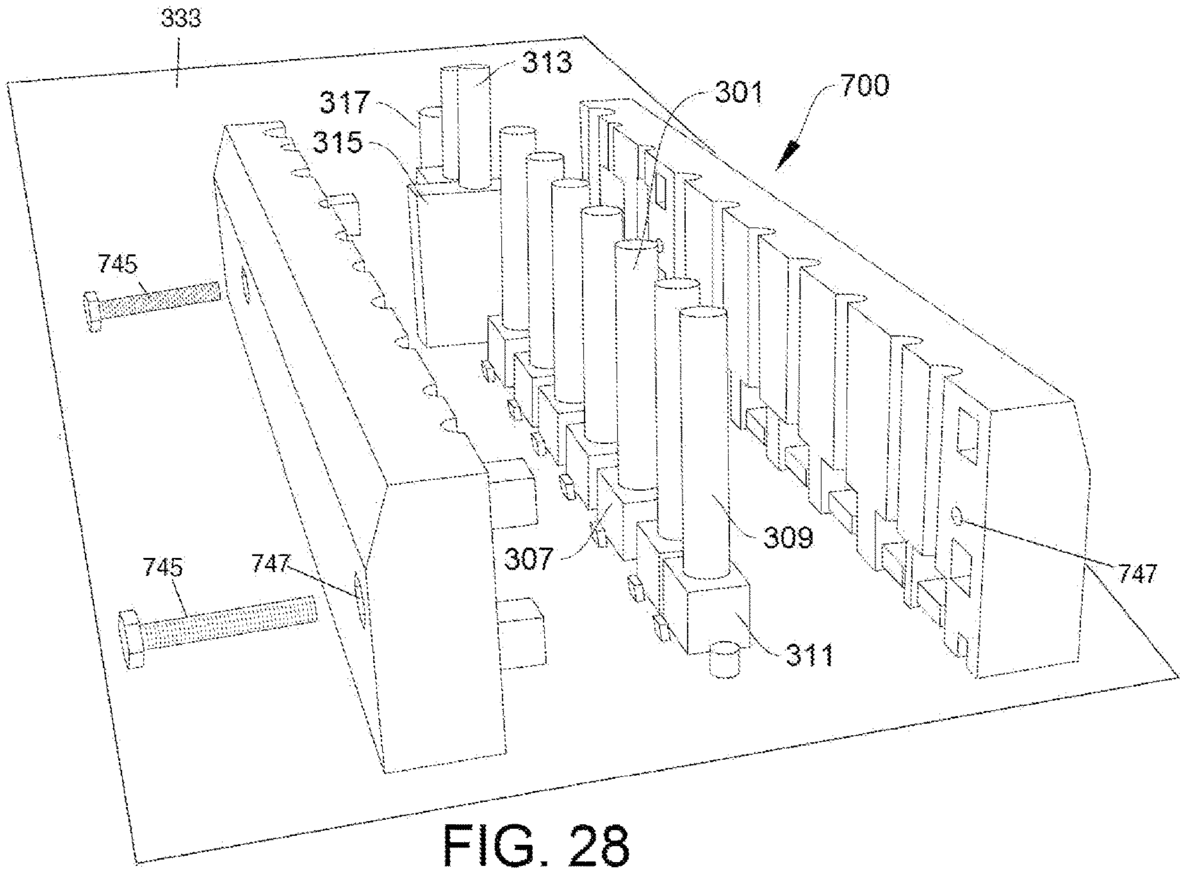
FIG. 28 illustrates a side perspective view of an embodiment of a locking cover for multiple cable connectors with multiple cables and cable connector plugs extending out of AP network equipment ports.

In some embodiments, locking cable covers can be designed for specific configurations of cable connectors on specific AP network equipment. For example, a single cover assembly can be used to prevent tampering with the authorized cables inserted into any of the RJ ports 801, USB port 803, power jack port 805, wide area network (WAN) port, and phone jack ports 807 connected to the AP device 800. The inventive cover can also cover and prevent the actuation of the reset switch and the WiFi protected setup (WPS) button. FIGS. 26-28 show multiple embodiments of a locking cover that can cover multiple cable connectors as well as other types of connectors. In this embodiment, the locking cover 700 is specifically designed for the AP device 800 as shown in FIG. 25. The locking cover 700 can have a first upper cover piece 701 and a second lower cover piece 703. The upper cover piece 701 can have aligning protrusions 705, and the lower cover piece 703 can have corresponding aligning recesses 707 that are adapted to contain the aligning protrusion 705 when the upper cover piece 701 is fastened to the lower cover piece 703. The mating of the aligning protrusions 705 and the corresponding aligning recesses 707 can insure that the upper cover piece 701 is properly aligned with the lower cover piece 703 when the locking cover 700 is assembled. FIG. 26 illustrates a cover assembly having an upper cover piece 701 coupled to a lower cover piece 703 with a hinge at one end and fasteners at an opposite end. FIGS. 27 and 28 illustrate a cover assembly having a separate upper cover piece 701 and a separate lower cover piece 703 coupled to each other with fasteners.

In the embodiments illustrated in FIGS. 26-28, the first upper cover piece 701 can have multiple cable recesses that match the ports on the AP network equipment. The cover pieces 701, 703 can have USB cable recesses 711, 713, 719, 721, power cable recesses 727, 729, 731, 733, and phone cable recesses 735, 737, 739, 741. Each of the RJ connector recesses 717 and phone jack connector recesses 741 can also each have a locking protrusion 743 that engages the recesses on the bottom surface of the RJ connectors and the phone jack connectors.

With reference to FIG. 28, when the cover components have been assembled around the authorized cable connectors and plugs that are in the ports of the AP network equipment 333, the first upper cover piece 701 can be locked and secured to the second cover piece 703 with one or more threaded bolts or screws or other fasteners 745. In this embodiment, there can be multiple tread and/or unthreaded holes 747 provided in the cover pieces 701, 703, and two screw fasteners 745 can be placed into the holes 747 and tightened against a threaded structure to locked and secured the two cover pieces 701, 703 to each other. The heads of the fasteners 745 can have proprietary driving features that can prevent unauthorized users from removing the fasteners 745 to access the ports of the AP network equipment 333. A proprietary tool may be required to unscrew the threaded fasteners from the cover pieces 701, 703.

As shown in FIG. 28, the locking cover 700 can cover multiple cable connectors including the RJ connector plug 307, phone connector plug 311, and USB connector 315. The second cover piece 703 can be put under the bottom side of the connector plugs letting the locking protrusion 743 engage the recess 305 on the bottom side of the connector plugs. Then the first cover piece 701 can be put above the top side of the connector plugs letting the aligning protrusion 705 on the first cover piece 701 engage the aligning recess 707 on the second cover piece 703. All the connector plugs can be contained in recesses formed by the paired recesses on the two cover pieces 701, 703, and all the cables can be contained in recesses formed by the paired recesses on the two cover pieces. The two screws 745 can be driven into the corresponding thread holes 747 to secure and lock the two cover pieces 701, 703 to each other.

Figure 29:
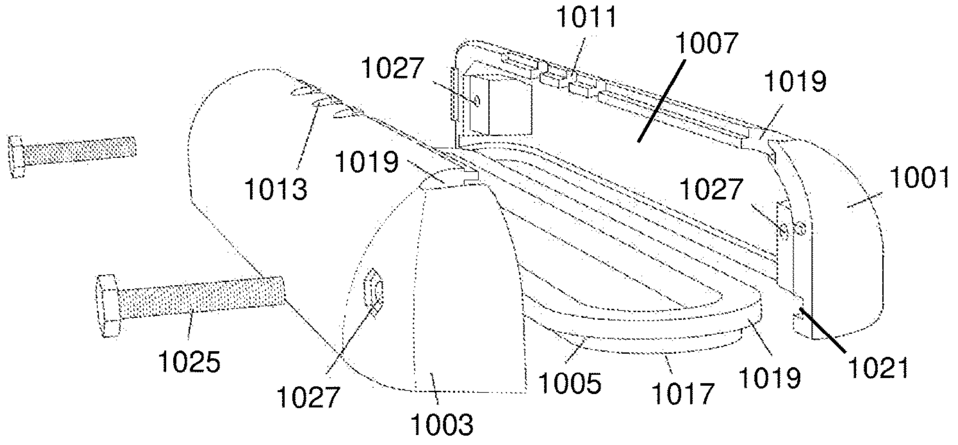
FIG. 29 illustrates an exploded side view of an embodiment of a locking cover for cable connectors in AP network equipment ports.
Figure 30:
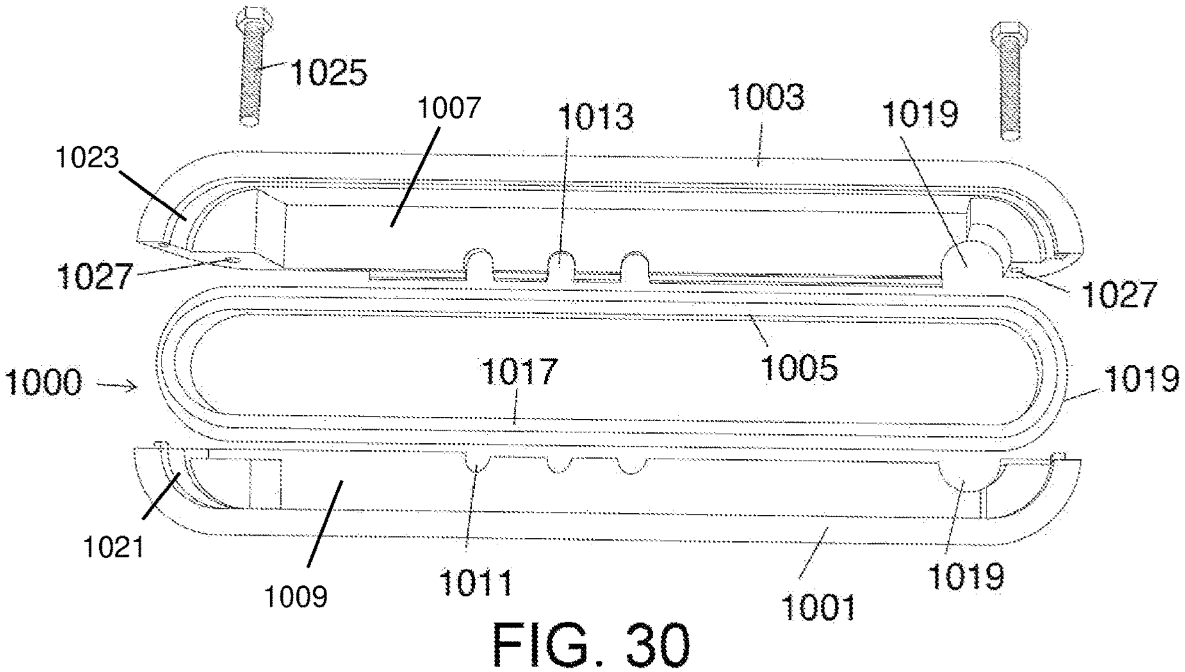
FIG. 30 illustrates an exploded front view of an embodiment of a locking cover for cable connectors in AP network equipment ports.
Figure 31:
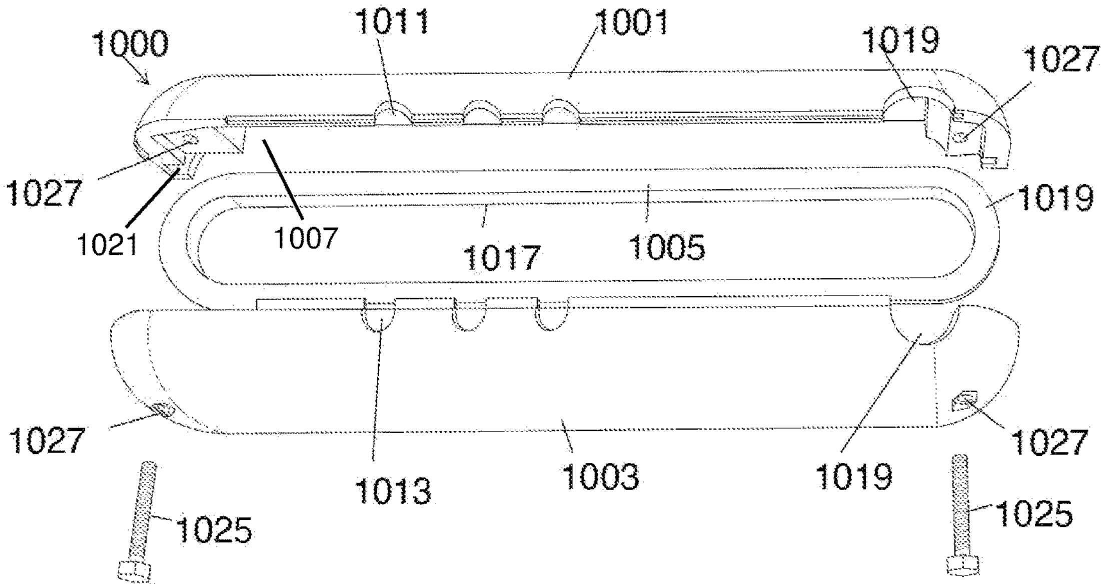
FIG. 31 illustrates an exploded rear view of an embodiment of a locking cover for cable connectors in AP network equipment ports.

FIGS. 29-31 illustrate another embodiment of a locking cover that can be secured to the AP network equipment to cover multiple cable ends and cable connectors. In the embodiment, the locking cover 1000 can have a first cover piece 1001, a second cover piece 1003, and a locking ring 1005. The first cover piece 1001 can have multiple first cable openings 1011, a first recessed volume 1007, and a first slot 1021 adjacent to the front edge. The second cover piece 1003 can also have multiple second cable openings 1013, a second recess volume 1009, and a second slot 1023 adjacent to the front edge. The locking ring 1005 can have a first cable facing surface 1015 and a second equipment facing surface 1017. The locking ring 1005 can have an oval shape and the equipment facing surface 1017 can be rigidly secured to the AP network equipment adjacent to and around the ports. The locking ring 1005 can have an L-shaped cross section that forms a flange 1019. When the first cover piece 1001 and the second cover piece 1003 are secured to the locking ring 1005, the flange 1019 can fit with both the first slot 1021 and the second slot 1023. This can cause the first cover piece 1001

Thread or unthreaded holes 1027 can be provided at various locations on the cover pieces 1001, 1003 and threaded fasteners can be used to secure and lock the cover pieces 1001, 1003 to each other around the locking ring 1005. In this embodiment, there can be two tread holes 1027 provided at both side end of the cover pieces, and two screws 1025 can be driven into the corresponding thread holes to rigidly couple the two cover pieces 701, 703.

The locking cover 1000 can cover multiple cable connectors. The locking ring 1005 can be attached to a back side of an AP device with multiple ports/jacks. In some embodiments, the second surface 1017 of the locking ring 1005 can be glued onto the back side of the AP device. The first cover piece 1001 and second cover piece 1003 can be put together with the first slot 1021 and the second slot 1023 engaging the flange 1019 of the locking ring 1005. The first cable opening 1011 and the second cable opening 1013 can form a cable opening through which cables coupled to the cable connection plugs can pass through.

In the locking cover embodiment illustrated in FIGS. 29-31, there are three smaller diameter communications cable openings 1011 and a larger diameter power cable opening 1019. In other embodiments, there can be different numbers of communications cable openings with different sizes, depending on the number, arrangement, and types of cables being connected to the ports of the connected AP network device. All the connector plugs can be partially within the space between the two assembled cover pieces 1001, 1003. The diameters of the holes formed by openings 1011, 1013 can be between about 2-6 millimeters in diameter. The power cable hole 1019 diameter can be between about 4-7 millimeters in diameter. The screw fasteners 1025 can have a proprietary driving feature head and can be screwed into the corresponding thread holes 1027 to lock the two cover pieces to each other. These fasteners 1025 may only be screwed into and removed from the cover pieces 1001, 1003 using a proprietary tool.

Figure 32:
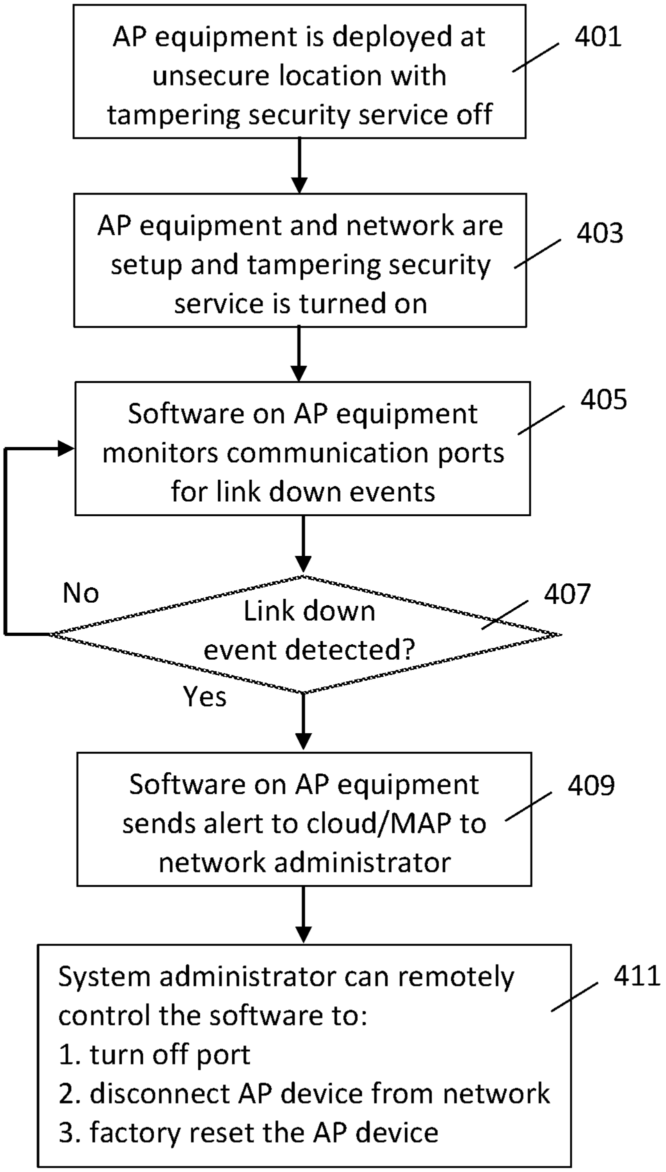
FIG. 32 is a flowchart of an embodiment of a process for providing a basic-level tampering security service for AP network equipment.

In some embodiments, software can be used alone or in combination with the described locking plugs and connector covers to provide additional tamper resistant security services to the AP network equipment. FIG. 32 is a flowchart illustrating how tamper detection software can provide a basic-level tampering security service to AP network equipment. The software can be programmed and/or configured to notify the network administrator if a link down event is detected. The network administrator can remotely control the software via a mobile App, GUI, CSC, etc.

The combination of locking connector plugs and a locking cover with tamper detection software can provide notifications and allow a system administrator to remotely implement additional network equipment security. The AP network equipment is installed at a location and tamper detecting software can be installed. When the AP network equipment is first installed, the security software services can be turned off 401. The AP network equipment can be connected to other network system components with the required communications cables and other cables plugged into available communications ports. All the empty communications ports are plugged in with locking connector plugs that can have electrically coupled conductors as described above. The conductive connectors 131 of the locking connector plugs can be electrically coupled to each other as described above with reference to FIG. 19 and closed circuits can be formed when the locking connector plug is inserted into the open RJ jack ports of the AP network equipment. Thus, the status of all the RJ jack or other communications ports can be detected by the tamper detecting software running on the AP network equipment.

Once the AP equipment and network are set up, the tampering service is turned on 403. The software monitors communications ports for link down events 405. Link down events occur when a communications cable is removed from a port of the AP network equipment. Conversely, link up events occur when a communications cable is plugged into a port. If the software detects the link down event 407, for example, one of the locking connector plugs or one of the authorized communications cable connectors has been removed from one or more of the ports of the AP network equipment. The tamper detection software can respond by sending an alert through cloud/Map to the network administrator 409. The administrator can remotely control the software to perform various actions to the AP network equipment including: 1. turning off the port that had the detected link down, 2. disconnecting the AP equipment from the network, or 3. factory resetting the AP network equipment 411.

Figure 33:
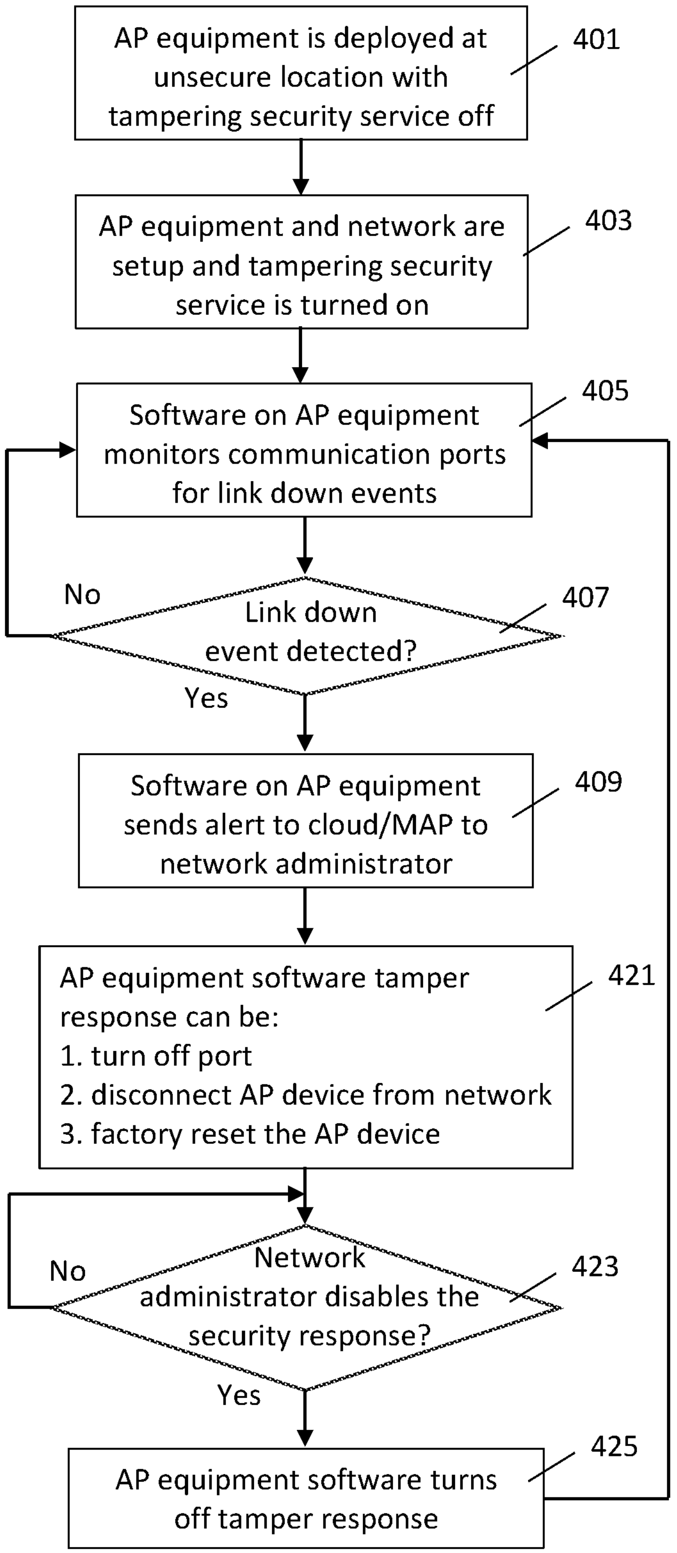
FIG. 33 is a flowchart of a process for providing an intermediate-level tampering security service for AP network equipment.

In some embodiments, software can be used to provide automated tampering security service to the AP network equipment. FIG. 33 is a flowchart reflecting how to use a software to provide an intermediate-level automated tampering security service to AP network equipment. The software can be programmed and/or configured to react to different tampering conditions detected on a RJ jack or other communications port of the AP equipment. The tampering security services can be configured, turned on or turned off by a network administrator via a computing device via an App, GUI or CSC, etc.

The AP equipment is deployed at an unsecured location with the tampering security service off 401. The RJ jack ports of the AP equipment are coupled to authorized communications cable and all the empty RJ jack ports can be plugged with the locking connector plugs with conductive connectors 131 that are electrically coupled to each other. Again, the status of all RJ jack ports can be detected by the tamper detection software running on the AP network equipment.

Once the AP equipment and network are setup, the tampering service is turned on 403. The software monitors communications ports for link down events 405. If the software detects the link down event 407, for example, one of the locking connector plugs has been unplugged, the software will send an alert to cloud/Map to the network administrator 409. The tamper detection software can also automatically instruct the AP equipment to perform various response actions. For example, tamper detection software can automatically instruct the AP equipment to: 1. turn off the port with the detected link down, 2. disconnect the AP equipment from network, and/or 3. factory reset the AP equipment 421. The network administrator can investigate the link down notification. If the notification is in response to unauthorized activity, the administrator can allow the software to continue to disable some or all of the AP network equipment. If the notification is in response to authorized activity, the administrator can remotely disable or turn off the security response 423.

The system administrator can remotely instruct the tamper detection software to turn off the tamper response 423. The tamper detection software can respond to the administrator instructions by turning off the tamper response 423 and returning to monitoring the communications ports for link down events 405. This configuration can provide higher level automated security to the AP network equipment.

Figure 34:
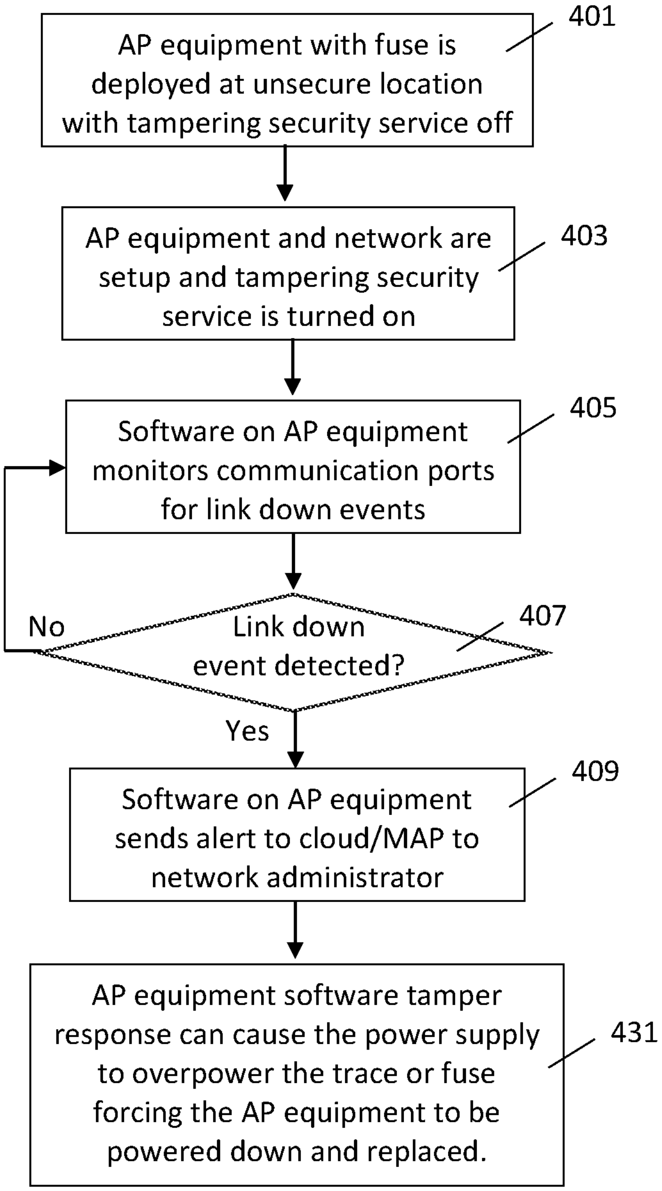
FIG. 34 is a flowchart of an embodiment of a process for providing a high-level tampering security service for AP network equipment.

In some embodiments, the AP network equipment can be used with high security data and networks. In these embodiments, it may be necessary to destroy or disable the AP network equipment when tampering is detected. The AP network equipment can use a thin PCB trace or a fuse can be destroyed in response to detected tampering to provide the highest level of security. FIG. 34 is a flowchart reflecting how to use a software and a thin PCB trace or a fuse to provide a high-level tampering security service to AP network equipment.

The AP equipment with a thin trace or a fuse is deployed at an unsecured location with the tampering security service off 401. The RJ jack ports of the AP equipment with links are plugged in, and all the empty RJ jacks are also plugged in with the locking connector plugs described above. As also described above, since the conductive connectors of the locking connector plug are electrically coupled to each other, a closed circuit is formed when the locking connector plugs are inserted into the RJ jack ports. Thus, the status of all the RJ jack or other communication ports can be detected by the tamper detection software running on the AP network equipment.

Once the AP equipment and network are setup, the tampering service is turned on 403. The software monitors communications ports for link down events 405. If the software detects the link down event 407, the software will send an alert to cloud/Map to the network administrator 409 and the tamper detection software can cause the power supply to overpower the thin trace or fuse. The excess power will destroy the thin trace or fuse forcing the AP network equipment to be powered down. The AP network equipment can be damaged and in order to restore the AP network equipment, the thin trace or fuse or the entire AP network equipment must be replaced 431. This configuration can provide the highest level of security.

Figure 35:
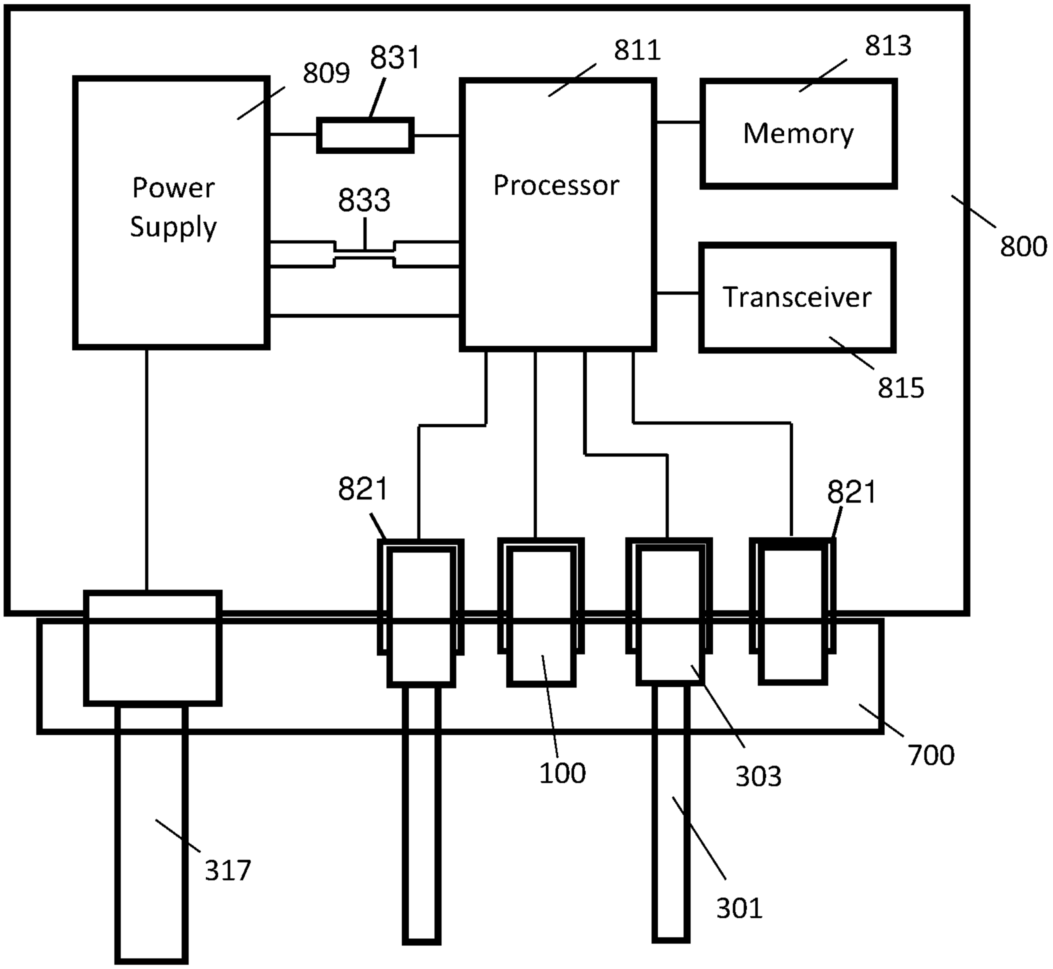
FIG. 35 is a block diagram of an embodiment of an AP network equipment with locking connector plugs, a locking cover over multiple cable connector plugs.

FIG. 35 illustrates a block diagram of an embodiment of the AP network equipment described in the flow charts. The AP network equipment 800 can have a processor 811 coupled to memory 813, a transceiver 815, and a power supply 809. A power cable 317 can be electrically coupled to the power supply 809 and a plurality of communications connectors 303 can be inserted into communication ports 821 that are coupled to the processor 811. A fuse 831 or a thin trace 833 can placed in a main electrical power supply to the other device components. Each of communications port 821 can be filled with either a communications cable connector 303 or a locking connector plug 100. A locking cover 700 can cover the power supply connector 317, the RJ cable connector 303 and the locking connector plug 100.

During the setup process, the AP network equipment 800 is configured and the normal operating signals from the communications ports 821 and the setup configuration can be stored in memory 813. When the tamper detection software is running, it can detect any changes in the normal operating signals by comparing them to the stored normal operating signals. Alternatively, the tamper detection software can detect link down and/or link up events. When tampering is detected, the processor can send an alert to cloud/Map to the network administrator through the transceiver 815. The processor 811 can also respond to the tamper detection software and administrator instructions received by the transceiver 815 by deactivating any port 821, disabling the AP network equipment 800. The processor 811 can also respond to administrator instructions by reactivating any port 821 or enabling the AP network equipment 800. In a highest security configuration, the processor 811 can increase the output of the power supply 809 to destroy the fuse 831 or destroy the thin trace 833 to permanently disable the AP network equipment 800.

Figure 36:
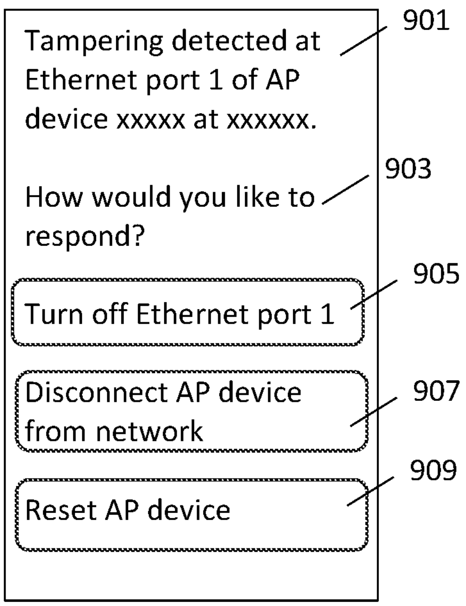
FIGS. 36-38 illustrate embodiments of UIs for a system administrator computing device.

FIG. 36 shows an embodiment of an administrator user interface (UI) layout corresponding to the process described above with reference to FIG. 32. The administrator UI layout includes an information display message 901 indicating which port of which AP device has been tampered in the network, a question display 903 asking "how would you like to respond?" A first button 905 can be actuated to turn off the port having the detected tampering. A second button 907 can be actuated to disconnect the tampered AP device from the network. A third button 909 can be actuated to reset the tampered AP device. If any of these buttons 905, 907, 909 is actuated, the administrator computing device can transmit instructions back to the AP device.

Figure 37:
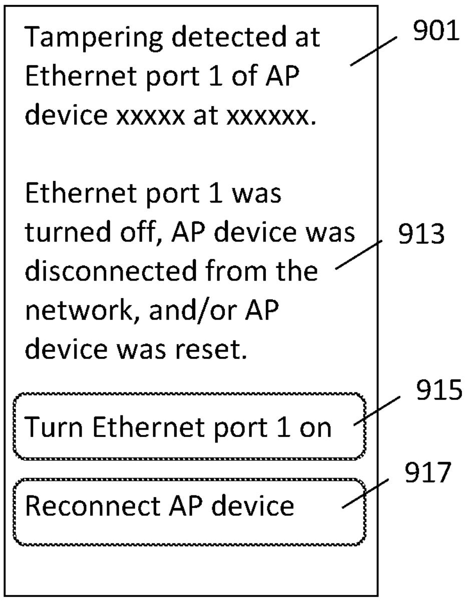

FIG. 37 shows an embodiment of an administrator user interface (UI) layout that can be displayed after the AP device has deactivated a port or the entire AP device. The administrator UI layout can include an information display message 901 indicating which port of the AP device that tampering has been detected. The UI can also provide a display 913 indicating which operation has been taken by the software. A first button 915 can be actuated to turn on the tamper detected port, and a second button 917 can be actuated to reconnect the tampered AP device to the network. If either of these buttons 915, 917 is actuated, the administrator computing device can transmit instructions back to the AP device.

Figure 38:
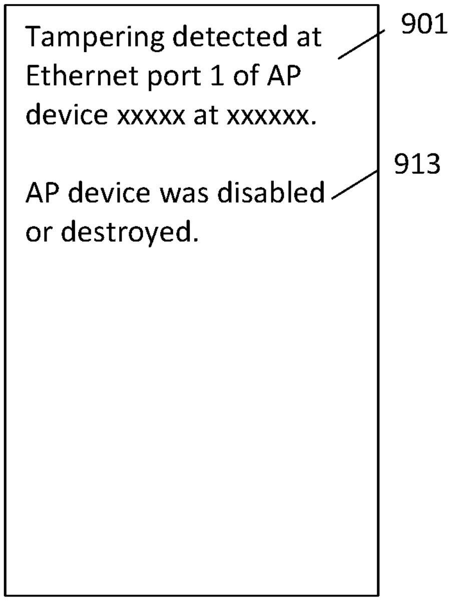

FIG. 38 illustrates an embodiment of an administrator UI layout in a high security configuration. The UI includes an information display 901 indicating which port of the AP network device that tampering has been detected, and an operation display 919 indicating that the tampered AP network device was disabled or destroyed. The administrator can respond by going to the AP device location or sending a technician and investigating the tampering incident.

The present disclosure, in various embodiments, includes components, methods, processes, systems, and/or apparatus substantially as depicted and described herein, including various embodiments, subcombinations, and subsets thereof. Those of skill in the art will understand how to make and use the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease, and/or reducing cost of implementation. Rather, as the following claims reflect, inventive aspects lie in less than all features of any single foregoing disclosed embodiment.

What is claimed is:

1. A network security system comprising:

a cable connector cover assembly having a connector side and a cable side, the cable connector cover assembly comprising:
- an upper connector cover;
- a lower connector cover;
- fasteners for rigidly securing the upper connector cover to the lower connector cover;

a first cable connector plug partially extending from a first connector port of a network access point equipment;

a first communications cable coupled to the first cable connector plug;

a second cable connector plug partially extending from a second connector port of the network access point equipment;

a second communications cable coupled to the second cable connector plug;

wherein the cable connector cover assembly surrounds portions of the first cable connector plug extending from the first connector port and the second cable connector plug extending from the second connector port and the first communications cable passes through a first hole in the cable side of the cable connector cover assembly and the second communications cable passes through a second hole in the cable side of the cable connector cover assembly and the first communication cable is compressed between the upper connector cover and the lower connector cover.

2. The network security system of claim 1 wherein the first cable connector plug and the second cable connector plug are Ethernet connector plugs.

3. The network security system of claim 1 further comprising:
- a power cable connector plug partially extending from a power connector port of the network access point equipment;
- a power cable coupled to the power cable connector plug;
- wherein the cable connector cover assembly surrounds an exposed portion of the power cable connector plug extending from the network access point equipment and the power cable passes through a third hole in the cable side of the cable connector cover assembly.

4. The network security system of claim 1 wherein the cable connector cover assembly further comprises:
- a first locking protrusion extending upward from the lower connector cover that is placed in a first recess in the first cable connector plug;
- a second locking protrusion extending upward from the lower connector cover that is placed in a second recess in the second cable connector plug; and
- a compression surface on the upper connector cover that holds the first cable connector plug against the first locking protrusion and holds the second cable connector plug against the second locking protrusion.

5. The network security system of claim 4 wherein the first locking protrusion has a rectangular cross section.

6. The network security system of claim 1 wherein the cable connector cover assembly further comprises a hinge that is coupled to the upper connector cover and the lower connector cover.

7. The network security system of claim 1 wherein the cable connector cover assembly further comprises a first passageway between the upper connector cover and the lower connector cover for the first cable connector plug and the first communications cable, and a second passageway between the upper connector cover and the lower connector cover for the second cable connector plug and the second communications cable.

8. The network security system of claim 1 wherein the second communication cable is compressed between the upper connector cover and the lower connector cover.

9. The network security system of claim 1 further comprising:
- a connector plug having a connector body partially extending from a third connector port of the network access point equipment and a plurality of adjacent conductive connectors on a front portion of the connector body, wherein a first pair of the plurality of conductive connectors are electrically coupled.

10. The network security system of claim 1 further comprising:
- a connector plug comprising:
  - a connector body partially extending from a third connector port of the network access point equipment;
  - a latch coupled to the connector body for securing the connector plug in the third connector port;
  - a locking member within the connector body, the locking member having a radial member coupled to an axial member;
- wherein the locking member has a locked position where a radial member extends through a slot in the connector body to a position above the upper surface of the connector body to prevent the latch from moving towards the connector body and an unlocked position where the first radial member is retracted into the connector body and the radial member does not prevent the latch from moving towards the upper surface of the connector plug body.

11. A network security system comprising:
- a cable connector cover assembly having a connector side and a cable side, the cable connector cover assembly comprising:
  - a port coupling rigidly coupled to a network access point equipment adjacent to a first connection port;
  - an upper connector cover;
  - a lower connector cover;
  - fasteners for rigidly securing the upper connector cover and the lower connector cover to the port coupling;
- a first cable connector plug partially extending from a first connector port of the network access point equipment and through the port coupling;
- a first communications cable coupled to the first cable connector plug;
- wherein the cable connector cover assembly surrounds a portion of the first cable connector plug extending from the first connector port and the first communication cable passes through a first hole in the cable side of the cable connector cover assembly and the first communication cable is compressed between the upper connection cover and the lower connection cover.

12. The network security system of claim 11 further comprising:
- a second cable connector plug partially extending from a second connector port of the network access point equipment and through the port coupling;
- a second communications cable coupled to the second cable connector;
- wherein the cable connector cover assembly surrounds a portion of the second cable connector plug extending from the second connector port and the second communication cable passes through a second hole in the cable side of the cable connector cover assembly.

13. The network security system of claim 12 further comprising:
- a power cable connector plug partially extending from a power connector port of the network access point equipment;
- a power cable coupled to the power cable connector;
- wherein the cable connector cover assembly surrounds an exposed portion of the power cable connector plug extending from the network access point equipment and the power cable passes through a third hole in the cable side of the cable connector cover assembly.

14. The network security system of claim 11 wherein the port coupling is adhesively attached to the network access point equipment.

15. The network security system of claim 11 wherein the port coupling is attached to the network access point equipment with screw fasteners.

16. The network security system of claim 11 wherein the port coupling has a flange that is parallel to a port surface of the network access point equipment and extends outward from an orifice of the port coupling and the upper connector cover and the lower connector cover each have a groove that the flange is placed into.

* * * * *